(12) United States Patent
Arecco et al.

(10) Patent No.: US 6,973,267 B1
(45) Date of Patent: Dec. 6, 2005

(54) AUTOPROTECTED OPTICAL COMMUNICATION RING NETWORK

(75) Inventors: Fulvio Arecco, Monza (IT); Valerio Viscardi, Paderno Dugnao (IT)

(73) Assignee: Cisco Technology, Inc., San Jose, CA (US)

( * ) Notice: Subject to any disclaimer, the term of this patent is extended or adjusted under 35 U.S.C. 154(b) by 535 days.

(21) Appl. No.: 09/608,657

(22) Filed: Jun. 30, 2000

Related U.S. Application Data

(60) Provisional application No. 60/142,534, filed on Jul. 7, 1999.

(30) Foreign Application Priority Data

Jul. 1, 1999 (EP) .................................. 99112552

(51) Int. Cl.[7] .................. H04J 14/02; H04B 10/08; H04B 10/14; H04B 10/24
(52) U.S. Cl. ................... 398/4; 398/3; 398/7; 398/20; 398/50; 398/59; 398/79; 398/83
(58) Field of Search .................. 359/117, 128, 110, 359/119, 124, 133; 385/16, 17, 24; 370/223, 370/224, 227, 228, 222, 242, 541; 398/79, 398/5; 340/506; 714/4

(56) References Cited

U.S. PATENT DOCUMENTS

| | | | |
|---|---|---|---|
| 5,647,035 A | 7/1997 | Cadeddu et al. | 385/24 |
| 5,751,454 A | 5/1998 | MacDonald et al. | 398/59 |
| 5,777,761 A | 7/1998 | Fee | 398/7 |
| 5,886,801 A | 3/1999 | Van Deventer | 398/59 |
| 6,005,694 A | 12/1999 | Liu | 398/6 |
| 6,046,832 A | 4/2000 | Fishman | 398/45 |
| 6,222,653 B1 | 4/2001 | Asahi | 398/4 |
| 6,246,667 B1 * | 6/2001 | Ballintine et al. | 370/224 |
| 6,331,906 B1 * | 12/2001 | Sharma et al. | 398/48 |
| 6,400,476 B1 * | 6/2002 | Arecco | 398/9 |

FOREIGN PATENT DOCUMENTS

| | | | |
|---|---|---|---|
| EP | 0 729 247 | 8/1996 | |
| EP | 920153 A2 * | 6/1999 | H04J 14/02 |

OTHER PUBLICATIONS

Karasan, E. and E. Goldstein. "Optical restoration at the wavelength-multiplex section level in WDM mesh networks." IEEE Photonics Technology Letters. vol. 10, No. 9, Sep. 1998: 1343-1345.*

* cited by examiner

*Primary Examiner*—Jason Chan
*Assistant Examiner*—David S. Kim
(74) *Attorney, Agent, or Firm*—Baker Botts L.L.P.

(57) ABSTRACT

An autoprotected optical communication ring network is disclosed. The ring network includes two optical carriers that are arranged for bidirectional transmission. Multiple optically reconfigurable nodes are connected along the optical carriers. The nodes communicate in pairs, defining non-overlapping working links. Under normal conditions, the nodes of each pair are optically configured to exchange optical signals over the working link at a first wavelength on the first carrier and at a second wavelength that is different from the first wavelength on the second carrier. During a failure condition, the first wavelength on the second carrier and the second wavelength on the first carrier are reserved for effecting a protection scheme, while the first wavelength on the first carrier and the second wavelength on the second carrier can still be used for unaffected working links.

18 Claims, 11 Drawing Sheets

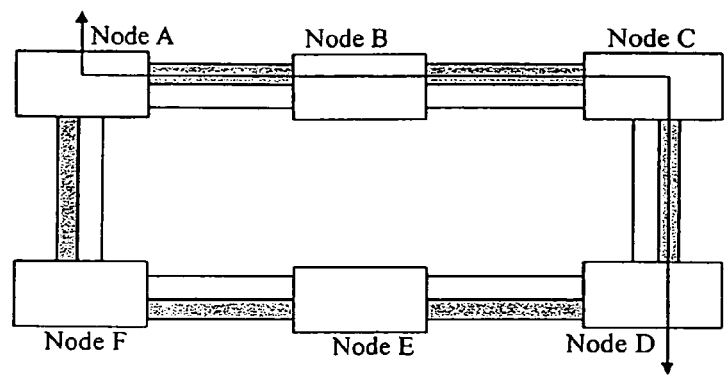
Fig. 1a
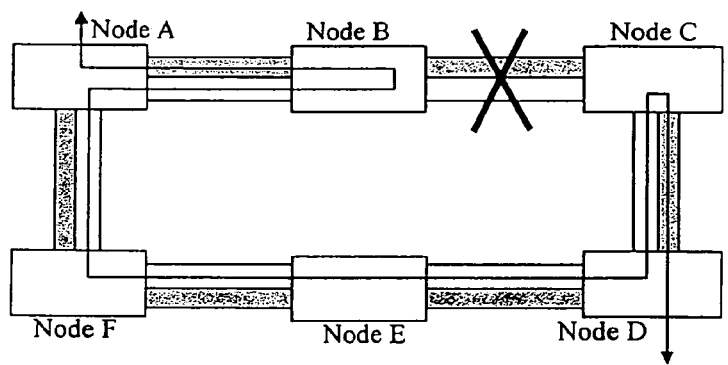
Fig. 1b
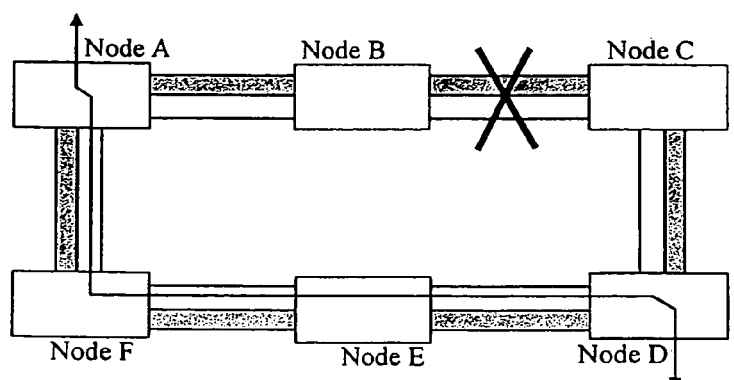
Fig. 1c
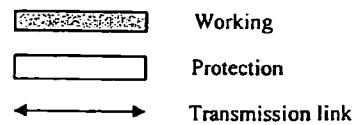

AUTOPROTECTED OPTICAL COMMUNICATION RING NETWORK

CROSS-REFERENCE TO RELATED APPLICATIONS

This application is related to and claims benefit of priority to (i) European Patent Application No. 991125527.7, filed Jul. 1, 1999 and (ii) U.S. Provisional Patent application Ser. No. 60/142,534, filed Jul. 7, 1999, entitled "AUTOPROTECTED OPTICAL COMMUNICATION RING NETWORK".

BACKGROUND OF THE INVENTION

1. Field of the Invention

The present invention relates to an optical communication system, and more particularly to a WDM (Wavelength Division Multiplexing) autoprotected optical communication ring network.

"Optical communication ring network" as used herein refers not only to an entire communication network that is configured as a ring, but in general, any section of a network that comprises a plurality of nodes and branches, and that is arranged, at least temporarily, in a ring configuration.

"Failure" as used herein refers to any event or condition which may affect the physical optical carriers (e.g., breakage or interruption of an optical fiber) and/or the devices of the network that operate on the transmitted signals (e.g., receivers, demultiplexers, amplifiers, etc.), in such a way as to bring about a situation of degradation of the transmission below a tolerable level; the term "failure" thus should in no way be interpreted as being limited only to events causing the complete interruption of the connection.

2. Discussion of the Background

The state of the art includes many methods to optically protect a set of wavelength multiplexed optical channels that are carried by a two-fiber optical ring network. European Patent Application No. 769859 (in the name of the Applicant) relates to a transparent optical self-healing-ring communication network in which at least two nodes are optically connected along a first and a second closed optical path having opposite transmission directions. Each node simultaneously feeds its transmitted signals to the first and the second closed optical pathes, so that the signals travel along complementary arcs of the ring. The receiving node selectively receives the signals from one of the two closed paths and, in case of failure on this closed path, switches reception on the other closed path. The Applicant observes that this Optical Channel Protection method, known as a "Optical Channel 1+1 Dedicated Ring Protection" method, requires that, for each wavelength used on one closed path, the same wavelength cannot be used on the other closed path other than for protection. Thus, with N wavelengths, only N protected channels can be used in the network.

European Patent Application No. 97123013.1-2209 (filed on Dec. 31, 1997 by the Applicant) relates to a method and an apparatus for transparent optical communication with two-fiber bidirectional ring with autoprotection and management of low priority traffic. The communication network comprises two optical fibers (an external one and an internal one) that interconnect the nodes. According to the proposed technique, if a first and a second node of the network are considered for mutual signal transmission, a high-priority traffic can be set up on a first bidirectional communication path defined between the two nodes on the external and internal fibers, using only an arc of the communication ring defined between the two nodes.

The arc complementary to that just described can be used as a second bidirectional communication path between the two nodes for low-priority traffic, using the same wavelength as the preceding channel. The protection mechanism consists of redirecting the high-priority traffic onto the second path in the case of a breakdown or degradation of communication on the first path, thus losing the low-priority traffic on the second path. This protection method is identifiable as a "Optical Channel 1:1 Dedicated Ring Protection" method with management of Low-Priority traffic. It is observed that, although this method provides a double capacity with respect to the previous technique, with N wavelengths it is still not possible to protect more than N channels.

An article entitled "MA Transparent, All-Optical, Metropolitan Network Experiment in a Field Environment: The 'PROMETEO' Self-Healing Ring", F. Arecco et al., IEEE Journal of Lightwave Technology, Vol. 5, December 1997, describes a method of providing protection against failures in a metropolitan ring network. According to this method, a working fiber ring is used to carry all the optical channels between nodes, while a protection fiber ring carries no traffic under normal operating conditions. In case of a failure, protection switching takes place at the nodes adjacent to the failure, reconfiguring in such a way as to route all the optical channels (i.e., all the wavelengths of the multiplex section) through the protection fiber ring to bypass the failure. This protection method is known as "Optical Multiplex Section Protection" method. It is once again observed that with N wavelengths, only N protected channels can be used. Additionally, under this approach, it is not possible to have different protection mechanisms (i.e., protection at different layers) for different channels, and that the optical path after a protection reconfiguration can be longer than the ring circumference.

U.S. Pat. No. 5,647,035 discloses a ring network communication structure on an optical carrier and a reconfigurable node for the structure. In the structure, a plurality of nodes are interconnected by means of connections that include at least a first and a second optical carrier, such as an optical fiber. Transmission between two nodes occurs on the ring according to a WDM scheme, by utilizing a first wavelength for communication in one direction on the first carrier and a second wavelength for communication in the opposite direction on the second carrier. The second wavelength on the first carrier and the first wavelength on the second carrier are reserved for protection (protection channels) and are "shared" among all the nodes. Under regular operation conditions of the network, in each node the signals conveyed by the two fibers are detected, processed as required in units of a higher hierarchical level, converted again in optical signals and re-transmitted towards a subsequent node. In the presence of a failure on one of the connections, the nodes adjacent to the failed connection reconfigure themselves to ensure the continuation of communication on the alternative path provided by the ring, by utilizing the first wavelength on the second carrier and the second wavelength on the first carrier. The described exemplary embodiment referring to just two wavelengths $\lambda_1$, $\lambda_2$, can be generalized to any number of wavelengths with a corresponding expansion of the described connection; switching matrices of the nxn type may be used.

In the ring network of U.S. Pat. No. 5,647,035, if multi-wavelength signals have to be managed, since signal re-routing is localized at the nodes adjacent to the failure, the protection operations have to be performed on the entire set of wavelengths of the multiplex section (as described for SDH in ITU-T Recommendation G-803 and G-841) and the reconfigured nodes must re-route all the working channels that were previously sent on the damaged ring segment to their respective protection channels running onto the complementary ring arc. This technique is then identifiable as an "Optical Multiplex Section Shared Protection" technique. Accordingly, each node in the network must be equipped with the optical switching tools for the complete set of wavelengths in the ring, and a switch matrix is then needed with a complexity which increases considerably with increasing the number of channels (e.g., if each channel carries 2.5 Gb/s and the system is adapted to transmit 16 channels, each matrix must be able to switch 16×2.5 Gb/s). The number of optical switching blocks that are required to protect N to MN/2 number of links (where N is the number of wavelengths and M the number of nodes) is always MN.

Furthermore, it is observed that in the Optical Multiplex Section Shared Protection, because the failure control is performed at the multiplex section level, a failure on a single optical channel (e.g., when a node transmitter is damaged) may be either ignored or may cause the reconfiguration of all the traffic, thereby causing a temporary failure of all the other working channels.

It is also noted that, in case such a network is reconfigured as a consequence of a failure, the protection path of a generic optical channel may be longer than the maximum ring circumference. This can occur when a generic bidirectional link is set up between two non-adjacent nodes in the network, as illustrated in FIG. 1a (where nodes A and D are involved). In case of failure the switching action is performed by the two nodes adjacent to the failure (i.e., nodes B and C), as shown in FIG. 1b. Each channel of the bidirectional link travels along the working path from the source node to one of the reconfigured nodes where it is routed into the protection path. Then it travels in opposite direction along all the ring network to the other reconfigured node where it is routed again on the working path and, finally, it reaches the destination node. This alternative optical channel path may have a length that exceeds the ring circumference, reaching values of several hundred kilometers and thus, causing a low S/N ratio and high levels of attenuation. In case of a transoceanic application, this protection solution may lead, due to loopbacks, to restoration transmission paths that would cross the ocean three times.

To overcome this problem, a different protection solution has been proposed, which is referred to as a "MS Shared Protection Ring—Transoceanic Application" in the Annex A of the Telecommunication Standard ITU-T Recommendation G.841. A failure is detected at the two nodes that are adjacent to the failure at the SDH multiplex section layer; subsequently, the nodes terminating the failed links are informed of the failure condition, causing a re-routing of the corresponding links on the complementary ring arc path, as illustrated in FIG. 1c. In other words, in case of failure, all the transmission links that are affected by the failure are bridged at their source nodes onto the protection channels that are directed away from the failure. When the affected links reach their final destination nodes, they are switched to their original drop point. Therefore, no loopbacks are established; and thus, there is no risk of having, in case of failure, restoration transmission paths that cross the ocean additional times.

U.S. Pat. No. 5,647,035 proposes a solution in which the failure control is over the entire optical multiplex section. It is noted that this solution may result in ignoring a failure on a single optical channel. In addition, the failure may cause the reconfiguration of all the traffic, resulting in temporary failure of all other working channels.

It is observed that a protection at the SDH layer requires a relatively complex electronic layout. Such a solution can operate only at a predetermined bit rate.

SUMMARY OF THE INVENTION

The present invention provides an improved shared protection technique, in which re-routing operations are performed only at the nodes that terminate the affected links and only on the failed channels, thus avoiding the drawbacks related to re-routing operations on the multiplex section. An optical reconfigurable connection mechanism allows the omission of a SDH layer protection mechanism. Moreover, the failure control is performed at the channel level, instead of the multiplex section level, thus overcoming the above mentioned drawbacks.

In the proposed network, the nodes communicate in pairs (defining bidirectional links), and under normal conditions, are optically configured to exchange signals on a respective working arc path at a respective first wavelength on a first carrier of the network and at a respective second wavelength on a second carrier of the network. In the complementary arc, the same wavelengths may be used in the same manner to define other links, while the first wavelength on the second carrier and the second wavelength on the first carrier are reserved for protection and are used in case of failure that affects one of the links. Each node of the proposed network is provided with a pair of OADM (Optical Add/Drop Multiplexers) for extracting from, and inserting in, the optical multiplex section, only the channels which the node is adapted to operate on. All the remaining channels are passed-through. Each node is further provided with a receiving/transmitting module for each pair of wavelengths defining a transmission link, said module optically connecting, in a selective way, the OADMs to optical transmitters and receivers operating at the wavelengths. Each receiving/transmitting module performs failure control and re-routing operations on the two corresponding wavelengths. Consequently, in case of failure, if one of the links managed by this node fails, the corresponding receiving/transmitting module, after detecting the failure by checking the channels status, is reconfigured in order to optically re-route the transmission on the complementary portion of the ring. The same operation is performed by the node at the other end of the failed link. Therefore, only the nodes that manage the affected links are optically reconfigured, and only the failured channels (instead of the global multiplex section) are re-routed.

The protection technique of the invention provides a number of advantages. By performing protection at the channel level, optical protection can be provided to a selected subset of optical channels, leaving the protection of the remaining channels up to the other layers (e.g., SDH) or to other optical protection mechanisms. Using an optical re-routing technique, it is possible to omit the SDH protection layer, thereby simplifying the node structure and allowing a direct connection to the ring network for clients using different protocols (possibly unprotected) like ATM, IP, etc. The proposed protection technique is therefore compatible with every client electronic transmission protocol.

The receiving/transmitting module in the protection scheme of the present invention includes an optical switching unit which, in contrast to the SDH switching layouts, can operate at different bit rates (e.g., 155 Mbit/s, 622 Mbit/s, 2,5 Gbit/s, 10 Gbit/s). The protection approach of the present invention enables client to client protection, because a failure is detectable, even if it affects a single channel. The prior art techniques generally allow only global failure detection on the multiplexed flux (by using threshold photodiodes). The number of switching blocks is always two times the number of protected channels (i.e., between 2N and MN, where N is the number of wavelengths and M the number of nodes) thus giving an advantage, with mixed traffic patterns, over the Optical Multiplex Section Shared Protection schema proposed in U.S. Pat. No. 5,647,035. For example, with 8 nodes, 32 wavelengths optical ring network (M=8, N=32), the required number of switching blocks for said Optical Multiplex Section Shared Protection schema is always 256. However, by using the Optical Channel Shared Protection schema of the present invention, the required number of switching blocks varies between 64 (in case of "hub traffic", i.e., one node communicating with all the other nodes) and 256 (in case of "uniform traffic", i.e., one node communicating only with its two adjacent nodes).

Since the reconfiguration takes place at the channel level instead of at the multiplex section level, there is no need to provide each node with a switching equipment to perform protection on all the network channels (in particular, it is then not necessary to use a complex switch matrix as in the Optical Multiplex Section Shared Protection scheme).

Unlike the Optical Multiplex Section Shared Protection scheme proposed in U.S. Pat. No. 5,647,035, the complexity of the node switching structure depends only on the number of links that are managed by the nodes, not on the number of wavelengths in the network. Additionally, the switching operations are performed external to the network; as such, no transitories are present. In particular, switching of the single channel is performed, as described below, between the receiving and the transmitting transponders. Therefore, the multiplexed optical flux conditions at the input of the node amplifier are substantially unchanged. Consequently, sudden power variations inside the network are avoided.

According to one aspect of the present invention, an autoprotected optical communication system comprises a first optical carrier that is configured to transport optical signals in a first direction. A second optical carrier is configured to transport optical signals in a second direction that is opposite to the first direction. A plurality of nodes are connected along the first optical carrier and the second optical carrier to form bidirectional links. The plurality of nodes communicate in pairs. One of the pairs defines a working link that is associated with a portion of the first optical carrier and a portion of the second optical carrier. The pair of nodes are configured to exchange optical signals using a first wavelength on the first optical carrier and a second wavelength that is different from the first wavelength on the second optical carrier during a normal condition. The one pair of nodes are configured to exchange optical signals using the first wavelength on the second optical carrier and the second wavelength on the first optical carrier during a failure condition.

Preferably, each of the plurality of nodes selectively uses a predetermined subset of wavelengths within a set of transmission wavelengths ($\lambda_1, \lambda_2, \ldots \lambda_N$). Each of the plurality of nodes comprises a plurality of optical add/drop multiplexers that are serially connected to the first optical carrier and the second optical carrier, respectively. Each of the optical add/drop multiplexers is configured to selectively perform at least one of adding the subset of wavelengths to the first optical carrier and to the second optical carrier, dropping the subset of wavelengths from the first optical carrier and the second optical carrier, and bypassing remaining wavelengths of the set of transmission wavelengths ($\lambda_1, \lambda_2, \ldots, \lambda_N$).

Preferably, each of the plurality of nodes comprises an optical transmitter, an optical receiver, and a reconfigurable optical switch unit that selectively couples the optical transmitter and the receiver to the first optical carrier and the second optical carrier.

Preferably, each of the plurality of nodes comprises a plurality of information insertion devices that optically coupled to the optical transmitter and configured to insert signalling information into the optical signals. A plurality of information extraction devices optically are coupled to the optical receiver and configured to extract signalling information from the optical signals.

Preferably, the plurality of information insertion devices and the plurality of information extraction devices include optical transponders that optically couple the optical switch unit to the first optical carrier and the second optical carrier. The optical transponders are configured to change wavelengths of the optical signals.

According to another aspect of the present invention, a method of providing autoprotection in an optical ring network, which includes a first optical carrier, and a second optical carrier, and a plurality of nodes that are connected along the first optical carrier and the second optical carrier and are configured to communicate in pairs to define bidirectional links, is disclosed. The method includes exchanging optical signals between one of the pairs of nodes over one of the bidirectional links by using a first wavelength on the first optical carrier and a second wavelength on the second optical carrier during normal operation. The method also includes detecting a failed link among the bidirectional links, and reconfiguring the nodes in the one pair to invoke a protection scheme that uses the first wavelength on the second optical carrier and the second wavelength on the first optical carrier to avoid the failed link.

Preferably, the method also includes using a predetermined subset of wavelengths within a set of transmission wavelengths that are carried by the first optical carrier and the second optical carrier, wherein the step of exchanging includes optically separating, at each node of the plurality of nodes, each wavelength of the subset of wavelengths from the set of transmission wavelengths.

Preferably, the step of detecting includes verifying, in each of the plurality of nodes and for each wavelength in the set of wavelengths, whether the optical signals are received.

Preferably, the step of detecting includes verifying, in each of the plurality of nodes and for each wavelength in the set of wavelengths, whether the optical signals are degraded.

Preferably, the step of detecting includes verifying, in each of the plurality of nodes and for each wavelength in the set of wavelengths, whether the optical signals include a failure message.

Preferably, the method further includes transmitting a failure message between the nodes in the one pair based upon at least one of non-receipt of the optical signals and receipt of the optical signals that are degraded.

Preferably, the step of reconfiguring includes switching optical connections which selectively couple an optical transmitter and an optical receiver to the first optical carrier and the second optical carrier.

According to yet another aspect of the present invention, a reconfigurable node of an autoprotected optical communication ring network, which has a first optical carrier and a second optical carrier, comprises an optical transmitter that is configured to generate optical signals. An optical receiver (Rx$_1$) is configured to receive optical signals. A plurality of transmitting transponders are optically coupled to the first optical carrier and the second optical carrier. A plurality of receiving transponders are optically coupled to the first optical carrier and the second optical carrier. A plurality of optical switches are coupled to the transmitting transponders and the receiving transponders. One of the optical switches is coupled to the optical transmitter; another one of the optical switches is coupled to the optical receiver. The optical switches are configured to operate selectively under a normal operating condition and under a failure condition. The transponders use a first wavelength on the first optical carrier and a second wavelength that is different from the first wavelength on the second optical carrier during the normal condition. During the failure condition, the transponders use the first wavelength on the second optical carrier and the second wavelength on the first optical carrier.

Preferably, the plurality of transmitting transponders include a first transmitting transponder that is optically coupled to the first optical carrier and is configured to modulate a signal at the first wavelength. A second transmitting transponder (TxT$_1$ ($\lambda_y$)) is optically coupled to the first optical carrier and is configured to modulate a signal at a second wavelength. A third transmitting transponder is optically coupled to a second optical carrier and is configured to modulate a signal at the first wavelength. The plurality of receiving transponders include a first receiving transponder that is optically coupled to the second optical carrier and is configured to demodulate a signal at the first wavelength. A second receiving transponder is optically coupled to the second optical carrier and configured to demodulate a signal at the second wavelength. A third receiving transponder is optically coupled to the first optical carrier and is configured to demodulate a signal at the second wavelength. Under the normal condition, the optical switches are configured to connect the optical transmitter to the first transmitting transponder or to the third transmitting transponder, to connect the first receiving transponder to the third transmitting transponder, to connect the second receiving transponder to the optical receiver, and to connect he third receiving transponder to the optical receiver or to the second transmitting transponder.

Preferably, the node further includes another optical transmitter that is configured to generate an optical signal that includes information to be transmitted in the network, and another optical receiver that is configured to receive an optical signal that includes information has been transmitted in the network. The plurality of transmitting transponders includes a fourth transmitting transponder that is optically coupled to the second optical carrier and is configured to modulate a signal at the second wavelength. The plurality of receiving transponders include a fourth receiving transponder that is optically coupled to the first optical carrier and is configured to demodulate a signal at the first wavelength. During normal condition, the optical switches are configured to connect the first receiving transponder to the third transmitting transponder or to the other receiver, to connect the fourth receiving transponder to the other receiver, and to connect the other optical transmitter to the second transmitting transponder or to the fourth transmitting transponder.

Preferably, the first wavelength and the second wavelength are selected from a set of transmission wavelengths ($\lambda_1, \lambda_2, \ldots, \lambda_N$). The node further includes a plurality of optical add/drop multiplexers that are configured to optically couple the transmitting transponders and the receiving transponders to the first optical carrier and the second optical carrier to feed and extract a subset of wavelengths from the optical carriers, and to pass-through a remaining wavelengths of the set of transmission wavelengths ($\lambda_1, \lambda_2, \ldots, \lambda_N$).

Preferably, the optical switches include 2×2 switches, or alternatively, 1×2 and 2×1 switches.

Preferably, the optical switches include discrete switching components or, alternatively, an integrated switching matrix.

Preferably, the optical switches include at least one of opto-mechanical switches, thermo-optical switches, magneto-optical switches, liquid crystal switches, semiconductor switches, electro-optical switches, micro-mechanical switches, and lithium niobate integrated circuit switches.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a, 1b, 1c show a conventional network ring under normal condition, failure condition with a multiplex section shared protection, and failure condition with a multiplex section shared protection—transoceanic application, respectively;

DESCRIPTION OF THE PREFERRED EMBODIMENTS

Figure 2:
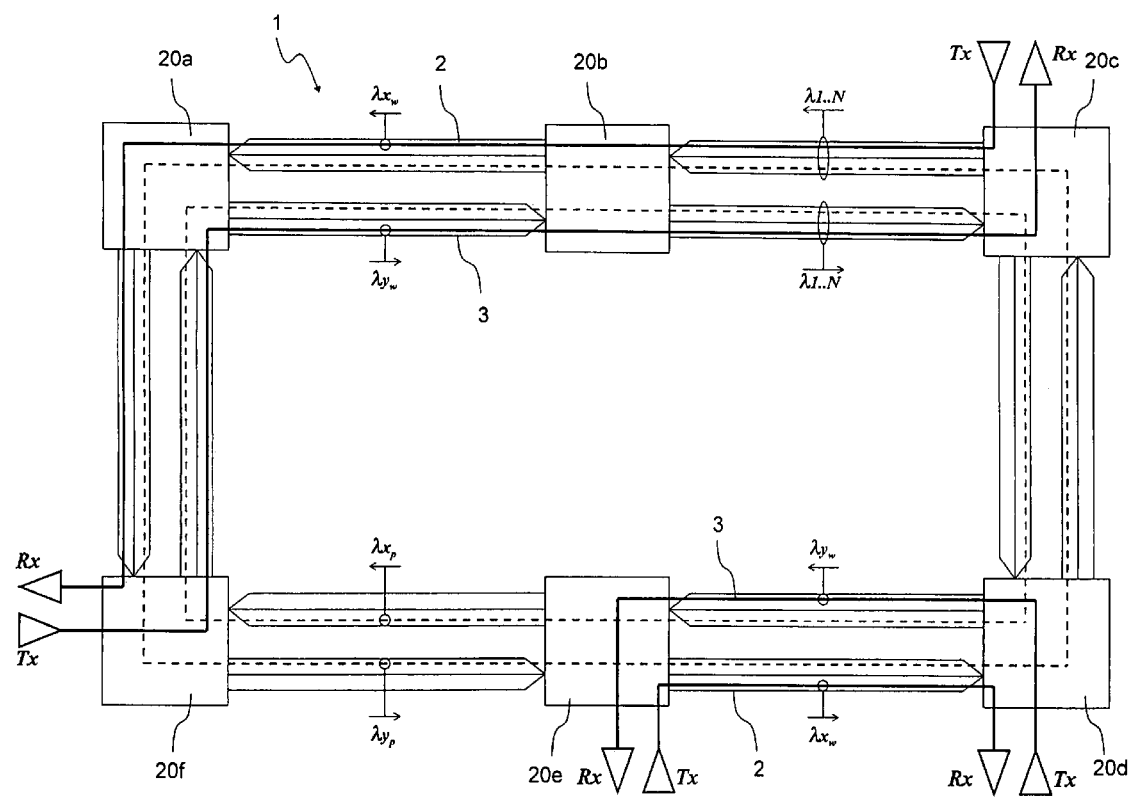
FIG. 2 is a schematic representation of an optical communication network operating under normal conditions and in which, by way of example, two transmission links are defined, according to an embodiment of the present invention.

Schematically shown in FIG. 2 is an optical communication ring network 1 according to an embodiment of the present invention. Network 1 includes a first and a second optical fiber ring 2, 3 defining respective optical carriers that have opposite transmission directions. The network 1 also includes a plurality of nodes 20a–20f, which are positioned along the first and the second ring 2, 3, for adding and dropping optical signals. Network 1 is adapted for both terrestrial transmissions and transoceanic transmissions. For long-haul transmissions, in particular, transoceanic transmissions, network 1 is preferably provided with line optical amplifiers and/or boosters and/or preamplifiers (not shown).

In FIG. 2, rings 2, 3 define an external ring having a counter-clockwise transmission direction and an internal ring with a clockwise transmission direction, respectively. The number of nodes in network 1, by way of example, is six; however, the present invention has applicability to networks with any number of nodes. Furthermore, in the example of FIG. 2, network 1 is shown to have two optical fibers; it is recognized by one of ordinary skill in the art that the nodes can be connected by any number of optical carriers.

Communication in network 1 is achieved according to a Wavelength Division Multiplexing (WDM) scheme using different channels at respective wavelengths on each ring. In particular, rings 2, 3 are adapted to convey optical signals in the transmission channels defined by a set of transmission wavelengths $\lambda_1, \lambda_2, \ldots \lambda_N$ within a predetermined wavelength transmission band.

Each of the nodes 20a–20f is adapted to manage a respective subset of wavelengths within the set of transmission wavelengths $\lambda_1, \lambda_2, \ldots, \lambda_N$ and to define bidirectional communication with one or more of the other nodes of network 1. Each pair of nodes, which is arranged to mutually communicate, splits network 1 into two complementary arc paths, at least one of which (identifiable as a "working path") allows bidirectional transmission between the two nodes under normal operating conditions (i.e., without failures), and the other (identifiable as a "protection path") accepts re-routed transmissions in the presence of a failure in the working path.

A pair of nodes are arranged to exchange data through the use of wavelengths $\lambda_x, \lambda_y$. Under normal operating conditions, on the working path as defined by the pair of nodes, a bidirectional working link is established by transmitting optical signals at the first wavelength $\lambda_x$ on the external ring 2 (in the counter clockwise direction) and at the second wavelength $\lambda_y$ on the internal ring 3 (in the clockwise direction). The second wavelength $\lambda_y$ is not used on the external ring 2; the first wavelength $\lambda_x$ is not used on the internal ring 3. The second wavelength $\lambda_y$ and the first wavelength $\lambda_x$ can then be used on the external ring 2 and, respectively, on the internal ring 3, to provide optical protection, as herein below described. The wavelengths that are used under normal operating conditions (i.e., $\lambda_x$ on the external ring 2 and $\lambda_y$ on the internal ring 3) to perform working links are identified with a "w" suffix ($\lambda_{x,w}, \lambda_{y,w}$), while the wavelengths which are adapted to be used for protection (i.e., $\lambda_y$ on the external ring 2 and $\lambda_x$ on the internal ring 3) are identified with a "p" suffix ($\lambda_{x,p}, \lambda_{y,p}$).

The first and the second wavelengths $\lambda_x, \lambda_y$ can be used on the protection path associated with the corresponding pair of nodes to perform a further bidirectional working link between the first and the second node or to perform further bidirectional working links between other pairs of nodes (which may include one of the previously considered nodes), provided that those further working links do not overlap with each other and with the above considered one. Thus, in general, the pair of wavelengths $\lambda_x, \lambda_y$ defines a "logical ring", i.e., a virtual ring which may include many non-overlapping working links operating at ($\lambda_{x,w}, \lambda_{y,w}$). Protection wavelengths $\lambda_{x,p}, \lambda_{y,p}$ are not used under normal operating conditions, and are shared among the different working links operating at $\lambda_{x,w}, \lambda_{y,w}$ (i.e., on the same logical ring). Overlapping working links can only be part of different logical rings and operate at different wavelengths.

The number of working links in a single logic ring depends on the client traffic pattern. For example, with M nodes and N wavelengths (N even), in case of "hub traffic" (i.e., one node communicating with all the other nodes) a maximum of N protected working links can be established because each logical ring can support only two working links, while in case of "uniform traffic" (i.e., each node communicating only with its two adjacent) a maximum of MN/2 protected working links are available because each logical ring (i.e., each pair of wavelengths) can support M working links.

In the example of FIG. 2, one working link is set up between node 20c and node 20f using the first working wavelength $\lambda_{x,w}$ on the external ring 2 and the second working wavelength $\lambda_{y,w}$ on the internal ring 3. Another working link is set up with the same wavelengths (and directions of propagation on the two rings 2, 3) between node 20d and node 20e. In this example, it is also possible to use the same wavelengths to set up a working link between node 20c and node 20d and between node 20e and node 20f, but it is not possible for example to set up a working link between node 20b and node 20e because it will overlap with the ring arcs already used by the previous links.

As will be described more fully, each of nodes 20a–20f provides optical add/drop/bypass functions for each wavelength within the wavelength transmission band on both the external and internal fiber rings 2, 3, together with optical amplification and regeneration (if necessary).

Figure 3:
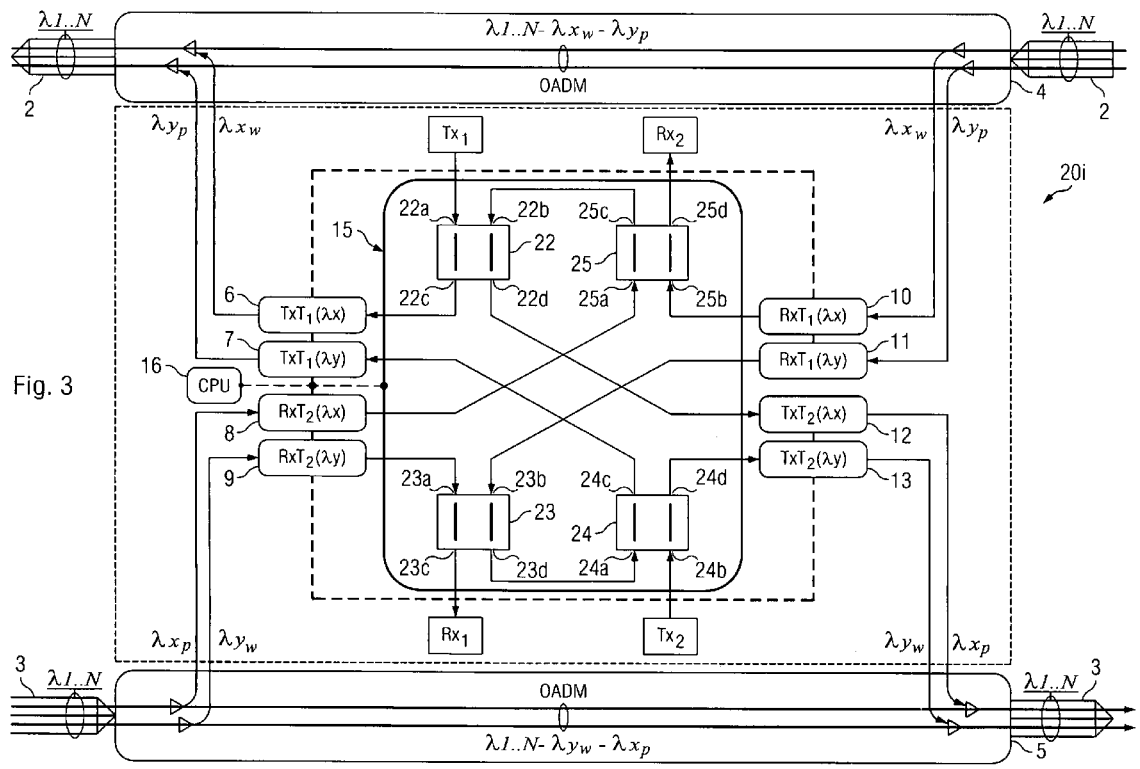
FIG. 3 is a diagram of a node in the network of FIG. 2, including a switching unit comprising 2×2 switches and operating under normal conditions.

FIG. 3 shows the structure of a generic node 20i of network 1, in particular of a node operating at wavelengths $\lambda_x$ and $\lambda_y$. Node 20i includes optical add/drop multiplexers (OADM) 4, 5 and a receiving/transmitting module 6. The receiving/transmitting module 6 contains the following components: transmitters $Tx_1$, $Tx_2$; receivers $Rx_1$, $Rx_2$; transmitting transponders $TXT_1$ ($\lambda_x$), $TxT_1(\lambda_y)$, $TxT_2(\pi_x)$, $TxT_2(\lambda_y)$; receiving transponders $RxT_1(\lambda_x)$, $RxT_1(\lambda_y)$, $RxT_2(\lambda_x)$, $RxT_2(\lambda_y)$; a switch unit 15; and a central processing unit (CPU) 16.

The OADMs 4, 5 have the capability to insert and extract optical signals at the working and protection wavelengths associated with node 20i (i.e., $\lambda_x$ and $\lambda_y$) into rings 2, 3, and to bypass the other transmission wavelengths. If required, OADMs 4, 5 may perform other functions within the wavelength transmission band, such as regeneration, performance monitoring, etc. The OADM 4 is coupled to the fiber of the external ring 2 for performing add/drop functions, while OADM 5 performs the add/drop functions on the internal ring 3. OADMs 4 and 5 may be implemented, for example, using the Pirelli Optical Systems OADM/P4–R1 (WaveMux6400 product family).

Transmitters $Tx_1$, $Tx_2$ and receivers $Rx_1$, $Rx_2$ represent the client access points for the input and the output of information. In particular, transmitters $Tx_1$, $Tx_2$ accept the input of information that are addressed to the two receivers that are connected to network 1. The input of information by transmitters $Tx_1$, $Tx_2$ may be performed at wavelengths not included in the transmission wavelength band of network 1, since the transmitting transponders TxTs provide the signals with the correct wavelength (i.e., with the first wavelength $\lambda_x$ or the second wavelength $\lambda_y$) $Tx_1$, $Tx_2$ may be, for example, a standard Sonet OC-48/SDH STM-16 terminal (produced for example by Nortel). Different bit rate terminals can be used provided that the transmitting transponders are compatible.

Receivers $Rx_1$, $Rx_2$ output information from the two transmitters that are connected to network 1. Receivers $Rx_1$, $Rx_2$ may be adapted to receive signals at wavelengths that are not included in the transmission wavelength band of network 1, since receiving transponders RxTs provide the signals from the network 1 with a wavelength adapted for reception receivers $Rx_1$, $Rx_2$. $Rx_1$, $Rx_2$ may be, for example, a Sonet OC-48/SDH STM-16 terminal (produced for example by Nortel). Different bit rate terminals can be used provided that the receiving transponders are compatible.

The transmitting transponders ($TxT_1(\lambda_x)$, $TxT_1(\lambda_y)$) are optically coupled to the external ring 2 by means of OADM 4 and are adapted to feed signals at wavelengths $\lambda_x$ and $\lambda_y$, to the external ring 2; the transmitting transponders ($TxT_2(\lambda_x)$, $TxT_2(\lambda_y)$) are optically coupled to the internal ring 3 by means of OADM 5 and are adapted to feed signals at wavelengths $\lambda_x$ and $\lambda_y$, to the internal ring 3.

Each transmitting transponder ($TxT_1(\lambda_x)$, $TxT_1(\lambda_y)$), ($TxT_2(\lambda_x)$, $T \times T_2(\lambda_y)$) may be of a type that is adapted to receive an optical signal from switch unit 15, to convert the optical signal into electrical format for processing, and to output a new optical signal with a predetermined wavelength within the wavelength band. Transmitting transponders of this type can be implemented, for example, using Pirelli Optical Systems WCM/F-xxx (WaveMux6400 product family, xxx=output wavelength code) transponders. Alternatively, the transmitting transponders may be completely optical devices (for example based on SOAs, Semiconductor Optical Amplifiers) to process information associated with the optical signal; for example managing a pilot tone over-modulating the optical wavelength that carries the signal.

Processing, in this case, includes providing the transmitted signals with information for protection purposes (e.g., channel identifier, performance monitoring, protection protocol) as channel overhead. This information is not part of the client payload and are added to the signal by the transmitting transponders under the supervision of the CPU 16. For example, a Pirelli Optical Systems WCM/F-xxx unit has the capability to add an overhead channel to the client payload to transport the signalling information. A similar technique, but operating at the multiplex section level, is used in the Sonet/SDH protocol at the transmitting side (e.g., channel overhead, multiplex section overhead with B1 monitor byte and K1/K2 APS bytes).

With respect to the receiving transponder ($RxT_1(\lambda_x, RxT_1(\lambda_y)$), these receiving transponders ($RxT_1(\lambda_x, RxT_1(\lambda_y)$) are optically coupled to the external ring 2 by means of the OADM 4 and are adapted to receive signals at wavelength $\lambda_x$ and $\lambda_y$. The receiving transponders ($RxT_2(\lambda_x, RxT_2(\lambda_y)$) are optically coupled to the internal ring 3 by means of the OADM 5 and are adapted to receive signals at wavelength $\lambda_x$ and $\lambda_y$. Each receiving transponder ($RxT_1(\lambda_x, RxT_1(\lambda_y)$) ($RxT_2(\lambda_x, RxT_2(\lambda_y)$) may be of the type adapted to receive an optical signal from rings 2, 3, to convert the optical signal into electrical format for processing, and to output a new optical signal with a predetermined wavelength within the wavelength adapted for reception by a corresponding receiver $Rx_1$, $Rx_2$. Receiving transponders can be implemented, for example, using Pirelli Optical Systems RXT-DM/F (WaveMux6400 product family) units. Alternatively, the receiving transponders, like the transmitting transponders, may be completely optical devices (for example based on SOAs, Semiconductor Optical Amplifiers). Processing, in this case, includes extracting from the received signals the information previously inserted as channel overhead by the corresponding TXT at the transmitting node for protection purposes (e.g., channel identifier, performance monitoring, protection protocol). The Pirelli Optical Systems RXT-DM/F unit, for example, is able to extract an overhead channel from the received signal to process the signalling information. A similar technique, but operating at the multiplex section level, is used in the Sonet/SDH protocol at the receiving side (e.g., channel overhead, multiplex section overhead with B1 monitor byte and K1/K2 APS bytes).

CPU 16 communicates with the transmitting and receiving transponders TxTs, RxTs to provide or to process the information related to the working links (link signalling), to check the operating conditions of the related working links, and to control switch unit 15 in accordance with the detected operating conditions. Link signalling includes channel identification information, which can be implemented for example either by means of a pilot tone over-modulating the optical wavelength carrying the signal or by using a TDM (Time Division Multiplexing) frame structure including the signal channels together with an extra channel for link signalling transmission. Logical connections between CPU 16 and its controlled units are represented in FIG. 3 as dashed lines.

Switch unit 15 is adapted to provide the optical switching facilities to implement the protection layout according to the present invention, by selectively connecting transmitters Txs and receivers Rxs to transmitting transponders TxTs and receiving transponders RxTs. As shown in FIG. 3, switch unit 15, in an exemplary embodiment, includes 2×2 optical switch 22–25 that are driven by CPU 16 through appropriate control logic (not shown). Optical switches 22–25 are, for example, 2×2 optomechanical switches (e.g., of the type produced by JDS FITEL, INC., 570 Heston Drive, Nepean, Ontario (CA) or of the type produced by E-TEK DYNAMICS, INC., 1885 Lundy Ave., San Jose, Calif. (USA)).

Optical switch 22 has an input 22a that is coupled to the transmitter $Tx_1$. The switch 22 also has an input 22b that is coupled to the output 25c of switch 25. The output 22c of switch 22 is coupled to the transmitting transponder $TxT_1(\lambda_x)$; the other output 22d of switch 22 is coupled to the transmitting transponder $TxT_2(\lambda_x)$;

As regards optical switch 23, the input 23a of switch 23 is coupled to the receiving transponder $RxT_2(\lambda_y)$. Switch 23 also has an input 23b that is coupled to the receiving transponder $RxT_1(\lambda_y)$. The outputs 23c and 23d of switch 23 are coupled to the receiver Rx, and to the input 24a of switch 24, respectively.

Switch 24 has an input 24a that is coupled to the output 23d of the switch 23, and an input 24b that is coupled to the transmitter $Tx_2$. The outputs 24c and 24d are coupled to the transmitting transponder $TxT_1(\lambda_y)$ and the transmitting transponder $TxT_2(\lambda_y)$, respectively.

Switch 25 has inputs 25a and 25b that are coupled to the receiving transponder RXT$_2$($\lambda_x$) and the receiving transponder RxT$_1$($\lambda_y$) respectively. Switch 25 has an output 25c that is coupled to the input 22b of the switch 22, and an output 25d that is coupled to the receiver Rx2.

Each optical switch 22–25 can operate in a bypass status (typically used under normal conditions), in which the first input is coupled to the first output and the second input is coupled to the second output. In a switched status (typically used in case of failure), each of the optical switches 22–25 has the first input that is coupled to the second output and the second input that is coupled to the first output.

The architecture of FIG. 3 is modular and can be applied for each logical ring in which the node acts as a link termination. In other words, node 20i may include a plurality of modules 6, each for managing a different pair of wavelengths. In this case, the wavelengths assigned to each logical ring are separately added/dropped by the two OADMs 4, 5 and processed separately by a corresponding module 6.

It is noted that the functional layout of the node described above can be physically implemented in different ways, for example integrating the CPU 16 or the transponders 6–13 inside the switch unit 15.

Switch unit 15 is over-dimensioned for the switching requirements of node 20i and it defines, in case of failure, some interconnections which are not operatively used. For example, while the receiving transponder RXT$_1$($\lambda_x$) is connected to the receiver Rx$_2$ under normal operating conditions, no connection is needed for the receiving transponder RXT$_1$($\lambda_x$) in case of failure on the external ring 2 on the right-hand side of node 20i (since no signal is received from this side). Taking into consideration this over-dimensioning of the switch unit functionality, it is possible to use, in place of the 2×2 switch type unit, other unit architectures which optimizes the number of interconnections in relation to the functional requirements. An interconnection example in node 20i under both normal and failure conditions (i.e., for working and protection) is summarized in the following table:

| | Rx$_1$ | Rx$_2$ | TXT$_1$($\lambda_x$) | TXT$_1$($\lambda_y$) | TXT$_2$($\lambda_x$) | TXT$_2$($\lambda_y$) |
|---|---|---|---|---|---|---|
| TX$_1$ | | | W | | P | |
| TX$_2$ | | | | P | | W |
| RXT$_1$($\lambda_x$) | | W | | | | |
| RXT$_1$($\lambda_y$) | P | | | W | | |
| RXT$_2$($\lambda_x$) | | P | | | | W |
| RXT$_2$($\lambda_y$) | W | | | | | |

W = Working
P = Protection

Figure 4:
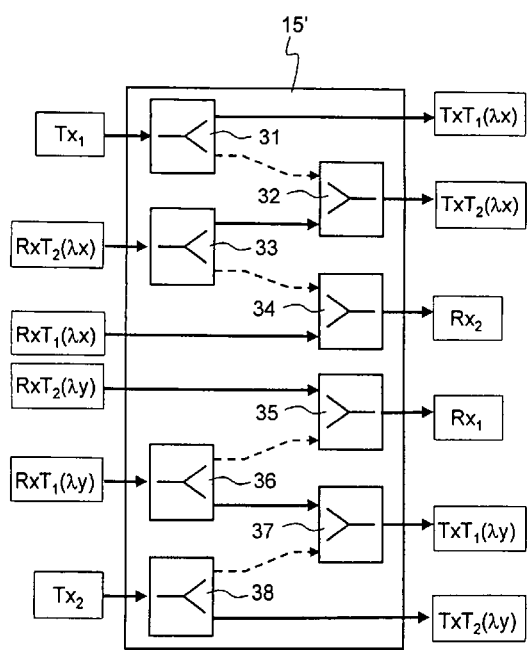
FIG. 4 is a diagram of a switching unit comprising 1×2 and 2×1 switches used in the network of FIG. 2 in place of the switching unit comprising 2×2 switches, operating under normal conditions.

FIG. 4 shows a switch unit 15' that includes 1×2 and 2×1 optomechanical switches. It should be noted that connections that are operative under normal conditions are shown with a continuous line, while connections which are not used under normal conditions are represented with a dashed line. Switch unit 15' can used in place of switch unit 15 in the system of FIG. 3. Switch unit 15' implements the required interconnection functionality and can be, for example, of the type produced by JDS FITEL, INC., 570 Heston Drive, Nepean, Ontario (CA) or of the type produced by E-TEK DYNAMICS, INC., 1885 Lundy Ave., San Jose, Calif. (USA). In FIG. 4, the input connections and the output connections of switch unit 15' are grouped on the left side and, respectively, on the right side of switch unit 15'.

Switch unit 15' include switches 31, 33, 36, and 38 of the 1×2 type and switches 32, 34, 35, and 37 of the 2×1 type. Switch 31 has an input that is coupled to the transmitter Tx$_1$ and an output that is coupled to the transmitting transponder TxT$_1$($\lambda_x$). Switch 32 of the 2×1 type has an input that is coupled to the output of switch 31 and an output that is coupled to the transmitting transponder TxT$_2$($\lambda_x$). Switch 33 of the 1×2 type has an input that is coupled to the third receiving transponder RxT$_2$($\lambda_x$) and an output that is coupled to the input of the switch 32. Switch 34 of the 2×1 type has an input that is coupled to the output of switch 33, as well as another input that is coupled to a receiving transponder RXT$_1$($\lambda_x$). The output of switch 34 is coupled to the receiver Rx$_2$. Switch 35 of the 2×1 type has an input that is coupled to the receiving transponder RxT$_2$($\lambda_y$) and an output that is coupled to the receiver Rx$_1$. Switch 36 of the 1×2 type has an input that is coupled to the receiving transponder RxT$_1$(Xy) and an output that is coupled to the input of the switch 35. Switch 37 of the 2×1 type has an input that is coupled to the output of switch 36 and an output that is coupled to the transmitting transponder TxT$_1$($\lambda_y$). Switch 38 of the 1×2 type, has an input that is coupled to the transmitter Tx$_2$ and an output that is coupled to the input of switch 37; the other output of switch 38 is coupled to the transmitting transponder TxT$_2$($\lambda_y$).

Figure 5:
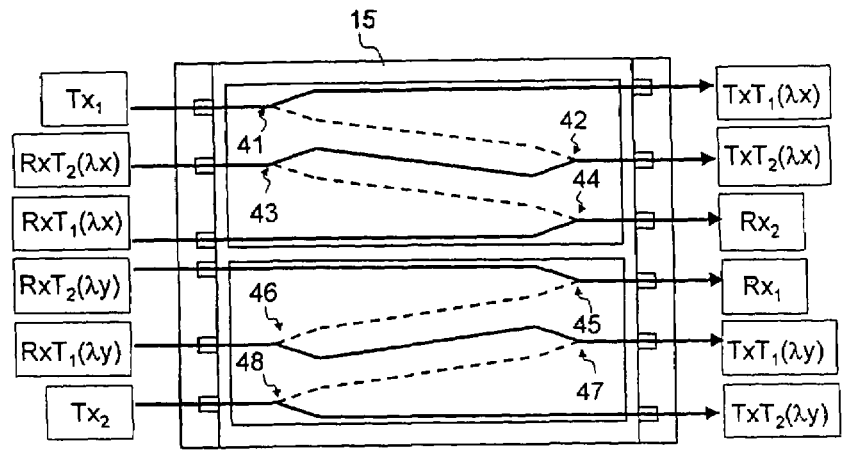
FIG. 5 is a diagram of a switching unit comprising an integrated switching circuit used in the network of FIG. 2 in place of the switching unit comprising 2×2 switches, operating under normal conditions.

FIG. 5 shows another embodiment of the switch unit according to the present invention. Switch unit 15" includes a lithium niobate (LiNbO$_3$) integrated switching matrix, in which interconnections among input and outputs are similarly configured to the layout of the switch unit 15' of FIG. 4. In particular, switch unit 15" includes four 1×2 switches, in which each of the 1×2 switches contains the following components: an input waveguide; a Y-shaped branching waveguide that has one input arm that is connected to input waveguide; and two output waveguides, in which each is connected to the output arms of the branching waveguide. As with FIG. 4, the connections which are operative under normal conditions are shown with a continuous line, while connections which are not used under normal condition are represented with a dashed line.

The switch unit 15" also has four 2×1 switches. Each of the four 2×1 switches includes the following components: two input waveguides; a Y-shaped branching waveguide with two input arms that are connected to the input waveguides; and an output waveguide that is connected to the output arm of the branching waveguide. Further, switch unit 15" includes electrodes (not shown) that are formed on the surface of the substrate in correspondence of the Y-shaped branching waveguides and adapted to produce the switching action between the two arms of the Y.

Switch 41 (1×2) has an input waveguide that is coupled to the transmitter Tx$_1$ and an output waveguide that is coupled to the transmitting transponder TxT$_1$($\lambda_x$). Switch 42 (2×1) has an input waveguide that is coupled to the output waveguide of switch 41 and an output waveguide that is coupled to the transmitting transponder TxT$_2$($\lambda_x$). Switch 43 (1×2) has an input waveguide that is coupled to the receiving transponder RXT$_2$($\lambda_x$) and an output waveguide that is coupled to the input waveguide of switch 42. Switch 44 (2×1) has an input waveguide that is coupled to the output waveguide of switch 43, and another input waveguide that is coupled to the receiving transponder RxT$_1$($\lambda_x$). The output waveguide of switch 43 is coupled to the receiver Rx$_2$. Switch 45 (2×1) has an input waveguide that is coupled to the receiving transponder RxT$_2$(Ay) and an output waveguide that is coupled to the receiver Rx$_1$. Switch 46 (1×2) has an input waveguide that is coupled to the receiving transponder $RxT_1(\lambda_y)$ and an output waveguide that is coupled to the second input waveguide of the switch 45. Switch 47 (2×1) has an input waveguide that is coupled to the output waveguide of switch 46 and an output waveguide that is coupled to the transmitting transponder $TxT_1(\lambda_y)$. Switch 48 (1×2) has an input waveguide that is coupled to the transmitter $Tx_2$, an output waveguide that is coupled to the input waveguide of switch 47, and another output waveguide that is coupled to the transmitting transponder $TxT_2(Ay)$.

The use of an integrated switching matrix offers several advantages over a switching matrix that employs discrete components (as with switch units 15 and 15'). In particular, opto-mechanical switch units 15 and 15' require a larger foot print than switch unit 15"; for example, a single 2×2 opto-mechanical switch may occupy a surface of about 48×18 mm$^2$, in which four switches are needed to form the switch unit 15, while the integrated switch unit 15" may occupy an area of about 4×65 mm$^2$. In addition, the integrated switch unit 15" has response times that are lower than opto-mechanical switch units 15 and 15'. In fact, integrated switch unit 15" exhibits response times of about 1 ms, while opto-mechanical switch units 15 and 15' have typical response times of about 5–10 ms. The use of a single integrated device in place of four 2×2 switches or eight 1×2 and 2×1 switches simplifies the piloting electronic circuit. Further, the integrated switch unit 15" is less expensive than opto-mechanical switch units 15 and 15'.

It is recognized that other types of switches can be used beyond those of units 15, 15', and 15". For example, these other switches, which may use a discrete components switching matrix or an integrated switching matrix, may include thermo-optical switches, magneto-optical switches, liquid crystal switches, SOA (Semiconductor Optical Amplifier) switches, electro-optical switches and micro-mechanical switches (MEMS).

Figure 6:
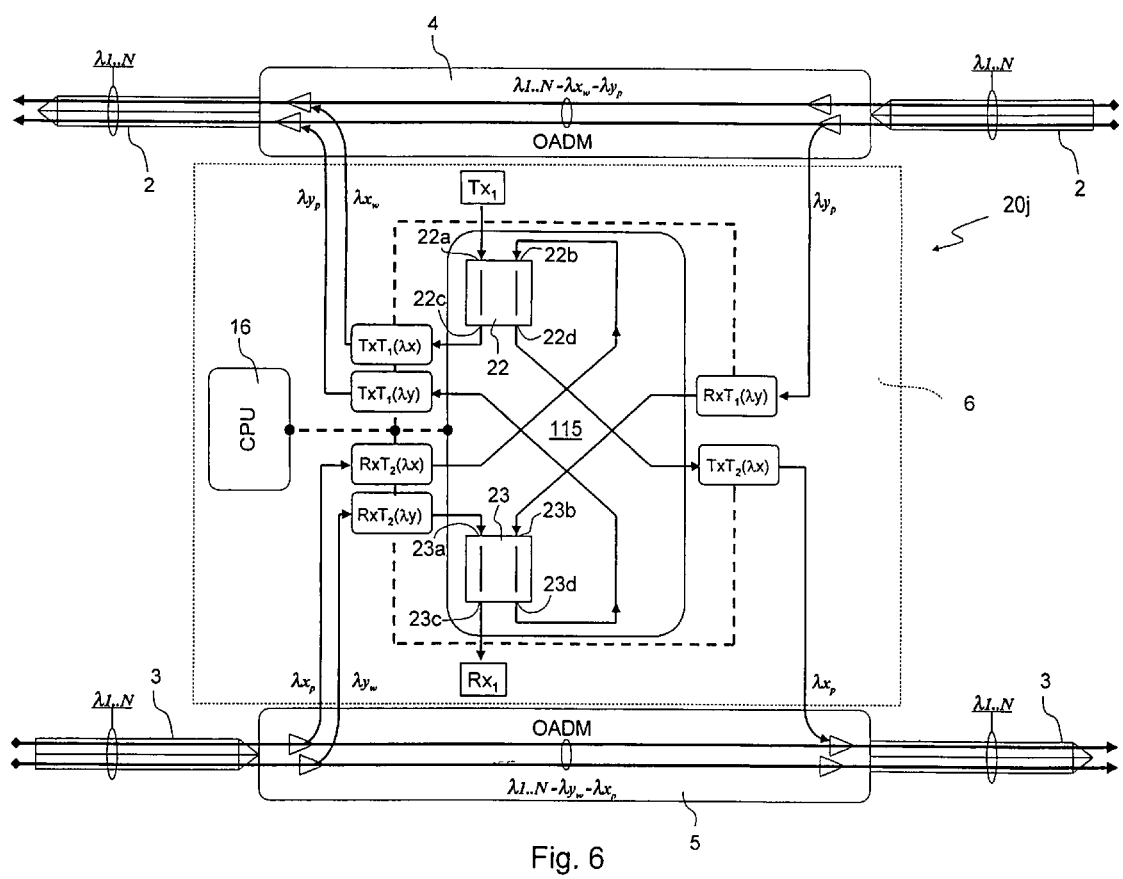
FIG. 6 is a diagram of a sub-equipped node for the network of FIG. 2, adapted to manage only one transmission link and including 2×2 switches.

The node structure previously described is adapted to manage two working links on the same logical ring. However, if the client traffic pattern requires only one working link to be terminated at a node, such node can be sub-equipped; that is, fewer components can be utilized. This situation is shown in FIG. 6, in which a one-link node 20j is adapted to manage a single working link on the left-hand side, shown under normal operating conditions. Node 20j differs from the node 20i of FIG. 3 in that the transmitter $Tx_2$, the receiver $Rx_2$, the receiving transponder $RXT_1(\lambda_x)$ and the transmitting transponder $TxT_2(\lambda_y)$ of node 20i are absent, and in that the node 20j includes a switch unit 115 which does not utilize switches 24, 25 of switch unit 15. In contrast to the architecture of FIG. 3, the receiving transponder $RXT_2(\lambda_x)$ is directly coupled to the input 22b of the switch 22 and the output 23d of switch 23 is directly coupled to the transmitting transponder $TxT_1(\lambda_y)$. The single working link that is managed by node 20j includes signals that are sent by node 20j to another node at the working wavelength $\lambda_{x,w}$ on the external ring 2 as well as signals that are received by node 20j from the other node at the working wavelength $\lambda_{y,w}$ on the internal ring 3. Protection wavelengths $\lambda_{x,p}$ and $\lambda_{y,p}$ are managed in the same way as previously described with respect to the two-link node.

Figure 7:
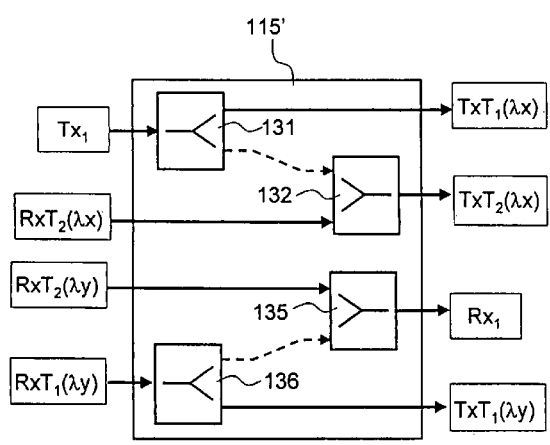
FIG. 7 is a diagram of a switching unit comprising 1×2 and 2×1 switches used in the network of FIG. 6 in place of the switching unit comprising 2×2 switches, under normal operating conditions.

FIG. 7 shows an alternative switch unit 115' for a one-link node, which can be used in place of switch unit 115 of FIG. 6. Switch unit 115' includes 1×2 and 2×1 optomechanical switches of the same type as those of switch unit 15' and implements the interconnection functionality that is required for node 20j, in which the unused interconnections are omitted. For purposes of explanation, input connections and output connections of switch unit 115' are grouped on the left side and on the right side, respectively, of switch unit 115'. The connections, which are operative under normal conditions, are shown with a continuous line, while connections which are not used under normal conditions are represented with a dashed line.

Switch unit 115' includes a switch 131 (1×2), a switch 132 (2×1), a switch 135 (2×1), and a switch 136 (1×2), which are equivalent to switches 31, 32, 35 and 36 of switch unit 15' (FIG. 4), respectively; however, switch unit 115' differs from switch unit 15' in that switches 33, 34, 37 and 38 of switch unit 15' are absent.

Switch 131 of the 1×2 type has an input that is coupled to the transmitter $Tx_1$ and an output that is coupled to the transmitting transponder $TxT_1(\lambda_x)$. Switch 132 of the 2×1 type has an input that is coupled to an output of switch 131, and another input that is coupled to the receiving transponder $RXT_2(\lambda_x)$. The output of switch 132 is coupled to the third transmitting transponder $TxT_2(AX)$. Switch 135 of the 2×1 type has an input that is coupled to the receiving transponder $RxT_2(Ay)$ and an output that is coupled to the receiver $Rx_1$. Switch 136 of the 1×2 type has an input that is coupled to the receiving transponder $RxT_1(\lambda_y)$, an output that is coupled to the input of switch 135, and another output is coupled to the transmitting transponder $TxT_1(\lambda y)$.

Figure 8:
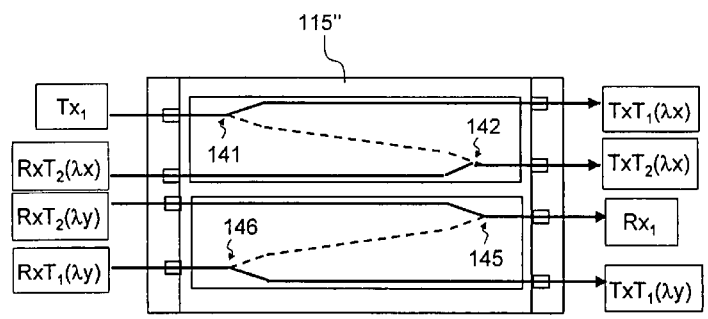
FIG. 8 is a diagram of a switching unit comprising an integrated switching circuit used in the network of FIG. 6 in place of the switching unit comprising 2×2 switches, under normal operating conditions.

FIG. 8 shows an integrated optics switch unit 115" that has a similar switching architecture of switch unit 115' of FIG. 7, but realized using the similar technology of switch unit 15" of FIG. 5 (i.e., lithium niobate (LiNbO$_3$) integrated circuit technology). Switch unit 115" includes a switch 141 (1×2), a switch 142 (2×1), a switch 145 (2×1), and a switch 146 (1×2), which perform the similar signal routing as the corresponding switches of switch unit 115' (FIG. 7).

Alternatively, switch units 115, 115' and 115" may include the following types of switch: thermo-optical switches, magneto-optical switches, liquid crystal switches, SOA (Semiconductor Optical Amplifier) switches, electro-optical switches and micro-mechanical switches (MEMS).

Attention is now drawn to the operation of Network 1 (FIG. 2). When a link between a first and a second node of the network 1 has to be established, a generic pair of first and second wavelengths $\lambda_x$, $\lambda_y$ is chosen within the wavelength band. A working link is then set up between the two nodes by connecting the transmitter $Tx_1$ of the first node to the receiver $Rx_2$ of the second node using the first wavelength $Tx_1$ on the external ring 2, and by connecting the transmitter $Tx_2$ of the second node to the receiver $Rx_1$ of the first node using the second wavelength $\lambda_y$ on the internal ring 3, on the same working arc path. As previously described, other working links may be set up in the protection path of the two nodes, provided that the working path used by each working link is non-overlapping with other working paths that are used by other working links using the same wavelengths. In this example, the second wavelength $\lambda_y$ on the external ring 2 and the first wavelength $\lambda_x$ on the internal ring 3 are not used under normal operating conditions, but are reserved for optical protection (i.e., are reserved for use in case of failure).

Each working link is controlled by the associated two terminating nodes. For a working link that operates at working wavelengths $\lambda_{x,w}$, $\lambda_{y,w}$, the two nodes at the end of the link provide the add/drop functions on working wavelengths $\lambda_{x,w}$ and $\lambda_{y,w}$ to/from the set of transmission wavelengths $(\lambda_1, \ldots, \lambda_N)$ Moreover, all the required monitoring functions on the transmitted signals (e.g., optical power level, channel identifier, BER performance, etc.) are performed at these terminating nodes. It is noted that the nodes that are not involved in processing signals at these working wavelengths $\lambda_{x,w}$ and $\lambda_{y,w}$ simply bypass the signals. Each node at the end of a working link using wavelengths $\lambda_{x,w}$ and $\lambda_{y,w}$ also control the protection wavelengths $\lambda_{x,p}$ and $\lambda_{y,p}$; these protection wavelengths are utilized by all the working links of the corresponding logical ring. The other nodes (i.e., the nodes external to this logical ring) do not perform any operation on $\lambda_{w,p}$ and $\lambda_{y,p}$, as these wavelengths are simply bypassed through these nodes. Basically, the nodes that are not included in a logical ring (i.e., nodes that do not terminate a working link on a particular logical ring) can be completely transparent to the wavelengths associated with the logical ring.

In the example of FIG. 2, the working link between node 20c and node 20f that utilize working wavelengths $\lambda_{x,w}$ and $\lambda_{y,w}$ is under control of these two nodes 20c and 20f. Likewise, the working link between nodes 20d and 20e, which use the same wavelengths, is under control of nodes 20d and 20e. Each of the nodes 20c, 20d, 20e, and 20f also control the protection wavelengths $\lambda_{x,w}$ and $\lambda_{y,w}$, associated with the corresponding logical ring to have access to the shared protection resource.

It is noted that nodes 20a and 20b cannot be part of the logical ring operating at working wavelengths $\lambda_{x,w}, \lambda_{y,w}$, but these nodes 20a and 20b may serve as termination nodes of working links at wavelengths different from $\lambda_{x,w}, \lambda_{y,w}$. Accordingly, nodes 20a and 20b do not perform any action on working wavelengths $\lambda_{x,w}, \lambda_{y,w}$ and protection wavelengths $\lambda_{x,p}, \lambda_{y,p}$; however, these nodes 20a and 20b may provide optical amplification on the set of transmission wavelengths $\lambda_1, \ldots, \lambda_N$. Furthermore, each of the nodes 20a and 20b may be required to provide functions like regeneration or monitoring on the bypassed wavelengths, in order to allow a constant performance control of the set of transmission wavelengths $\lambda_1, \lambda_2, \ldots \lambda_N$ over the entire ring network. Under failure conditions, these nodes 20a and 20b need not provide any reconfiguration of the channels that are carried by the bypassed wavelengths.

With reference to FIG. 3, the signal flow inside the node 20i, under normal operating conditions, is now described. Upon reception of the optical signals, the OADM 4, 5 drop the wavelengths associated with the logical rings. All the other wavelengths may be directly bypassed to the node output without any processing. OADM 4 drops from the set of transmission wavelengths $\lambda_1, \ldots \lambda_N$ on the external ring 2 both the working and protection wavelengths $\lambda_{x,w}, \lambda_{y,p}$, (and possibly working and protection wavelengths of other logical rings to be managed), while OADM 5 drops from the set of transmission wavelengths $\lambda_1, \ldots, \lambda_N$ on the internal ring 3 both the working and protection wavelengths $\lambda_{x,p}$ and $\lambda_{y,p}$ (and possibly working and protection wavelengths of other logical rings). Wavelengths $\lambda_{y,w}, \lambda_{y,p}, \lambda_{y,w}$ and $\lambda_{x,p}$ are sent directly to the respective receiving transponders $RXT_1$ ($\lambda_x$), $RxT_1(\lambda_y)$, $RXT_2(\lambda_y)$, and $RXT_2$ (X), in which, after electrical conversion, information related to the link (link signaling) is extracted and sent to the CPU 16 for processing. After processing, wavelengths $\lambda_{x,w}, \lambda_{y,p}, \lambda_{y,w}$ and $\lambda_{x,p}$ are converted back to optical signals with a new optical format.

The working wavelength $\lambda_y$,w is then routed through switch unit 15 to the receiver $Rx_1$, and the working wavelength $\lambda_{x,w}$ is routed through switch unit 15 to the receiver $Rx_2$. The protection wavelengths $\lambda_{x,p}$ and $\lambda_{y,p}$ are bypassed through switch unit 15 to the transmitting transponder $TXT_2(\lambda_x)$ and to the transmitting transponder $TxT_1(\lambda_y)$, respectively, from where they are fed to the internal ring 3 and to the external ring 2 by the respective OADM 5 and OADM 4. Signalling information that is carried by the protection wavelengths is left unchanged, because the protection scheme has not been evoked on the two working channels.

Signals that are generated by the transmitter $Tx_1$ are routed through switch unit 15 to the transmitting transponder $TxT_1(\lambda_x)$ for transmission on the working wavelength $\lambda_{x,w}$. The signals that generated by the transmitter $Tx_2$ are routed through switch unit 15 to the transmitting transponder $TxT_2(\lambda_y)$ for transmission on the working wavelength $\lambda_{y,w}$. Within the transmitting transponders $TXT_1$ ($\lambda_x$), $TxT_2(\lambda_y)$, appropriate information (link signalling, channel identifier) that is generated by CPU 16 is added (for example by using bytes k1 and k2 as recommended in the ITU-T standard) to signals on the working wavelength $\lambda_{x,w}$ and the working wavelength $\lambda_{y,w}$, respectively. These wavelengths are then sent to the external and internal rings 2, 3 by OADMs 4, 5, respectively.

Identical operations are performed in each receiving/transmitting module that is included in node 20i, for corresponding pairs of wavelengths that have to be managed by this node.

When a failure occurs, reconfiguration takes place in all the logical rings, including at least the working link whose transmission is affected by the failure. As earlier defined, failure is any event or condition that affects the transmission of signals between two node; such events or conditions may be a fiber cut, or equipment malfunction (e.g., OADM or transponder malfunction). Reconfiguration is performed independently for each logical ring. In particular, for each working link that is affected by the failure, reconfiguration takes place only at the pair of nodes that terminate the link, while the nodes that are interposed between these terminating nodes do not perform any action to restore the failed link.

As a consequence of a failure on a working link, which operate at the working wavelengths $\lambda_{x,w}, \lambda_{y,w}$ the associated terminating two nodes detect the failure condition (as will be more fully described below) and run the reconfiguration process by switching the transmission on the respective protection arc path, using the protection wavelengths $\lambda_{x,p}$, $\lambda_{y,p}$. That is, signals that are previously transmitted at the working wavelength $\lambda_{x,w}$ on the external ring 2 are switched at the protection wavelength $\lambda_{x,p}$ on the internal ring 3, while signals previously transmitted at the working wavelength $\lambda_{y,w}$ on the internal ring 3 are switched at the protection wavelength $\lambda_{y,p}$ on the external ring 2.

The working link between the two nodes is consequently re-routed on the respective protection path by using the protection wavelengths $\lambda_{x,p}, \lambda_{y,p}$, even through other nodes which are terminating other working links on the same logical ring. These other nodes do not perform any action resulting from the reconfiguration process, as performed by the nodes terminating the failed working link, but must be aware of the presence of a signal carried by the protection wavelengths in order to know that the protection scheme has been invoked by another working link of the same logical ring. Therefore, as a consequence of the protection operations being performed on the failed working link, all the other working links of the same logical ring become unprotected. This situation persists until the failure has been repaired and the transmission previously switched on the protection path has been restored on the original working link. In other words, nodes that terminate working links sharing the same protection resource of the failed one (i.e., the working links of the same logical ring) must have the protection mechanism inhibited until normal conditions are restored.

Figure 9:
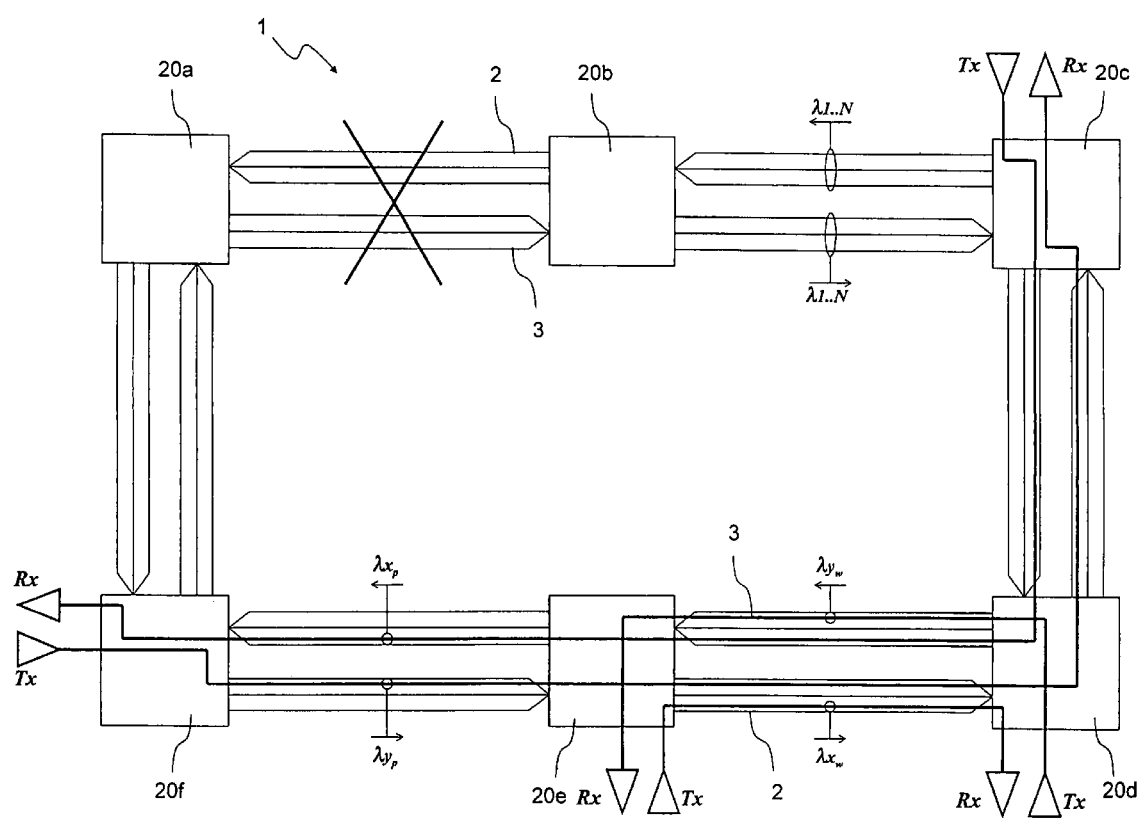
FIG. 9 is a diagram of the network of FIG. 2 under a failure condition.

FIG. 9 shows a situation in which a failure occurs in the ring network of FIG. 2 between nodes 20a and 20b. In such a case, nodes 20a and 20b do not perform any activity in response to the failure, because, under this scenario, these nodes 20a and 20b are not terminating nodes of a working link that is affected by the failure.

Figure 13:
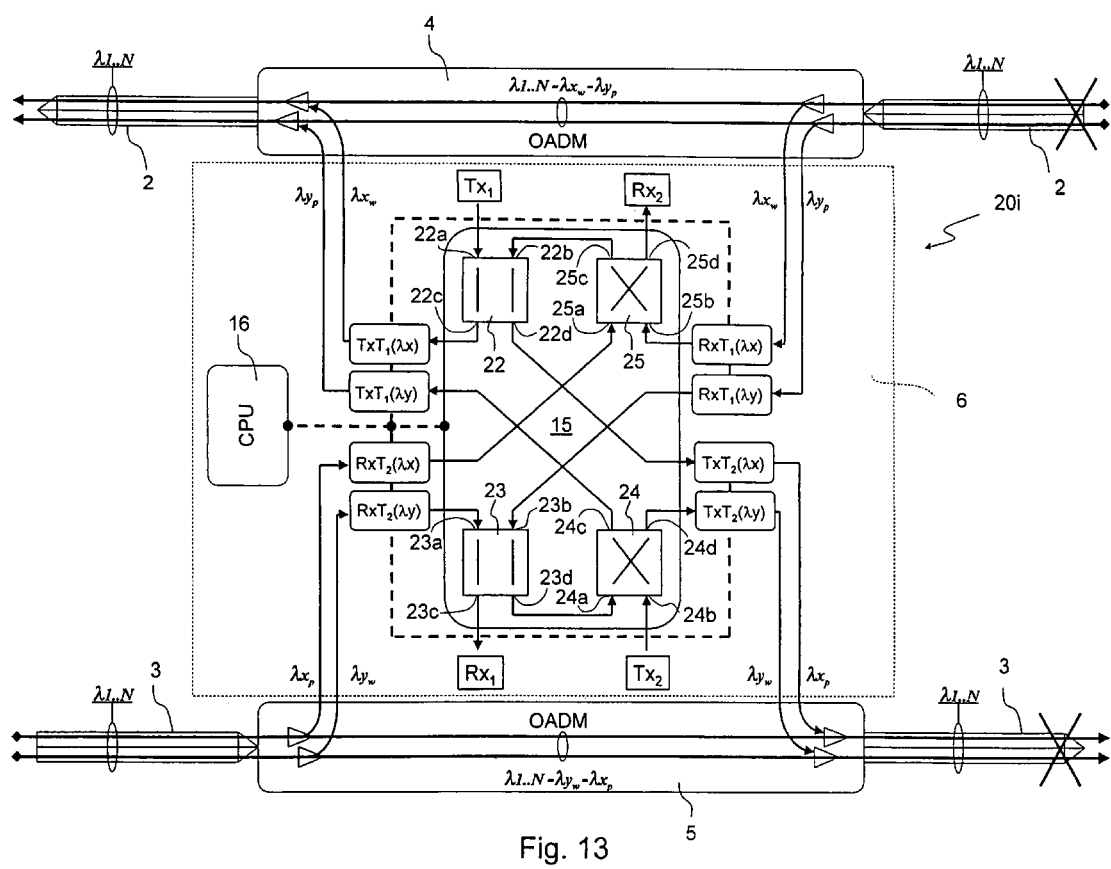
FIG. 13 is a diagram of the reconfiguration of the node of FIG. 3 when a failure occurs on the right-hand side of the node.

An exemplary sequence of operations that is performed by nodes 20c and 20f for failure detection and corresponding signalling is now described. It is recognized that different sequences of operations may alternatively be used, without departing from the scope of the present invention; all leading to a transitory condition at the end of which nodes 20c and 20f are both reconfigured. Assuming that the failure affects only the transmission from node 20f to node 20c (along the internal ring 3), while the opposite transmission (along the external ring 2) is still operative, node 20c detects the absence of signals or a signal quality degradation (corresponding, for example, to a BER over a predetermined threshold) at the working wavelength $\lambda_{y,w}$ on the receiving transponder $RxT_2(\lambda_y)$. Consequently, CPU 16 of node 20c executes instruction to reconfigure switch unit 15 (as hereinbelow described with reference to FIG. 10) in order to switch the transmission (in the manner described below) on the protection path. Before reconfiguration takes place, node 20c sends node 20f a failure message, preferably along both the external ring 2 (in the counter-clockwise direction) and the internal ring 3 (in the clockwise direction) using the protection wavelengths $\lambda_{y,p}$ and $\lambda_{y,p}$, to inform node 20f of the condition. In the preferred case of the bidirectional message transmission, node 20f receives the message from both the external ring 2 and the internal ring 3 (for example at the protection wavelengths $\lambda_{x,p}$ and $\lambda_{x,p}$); in response to the message, node 20f performs the reconfiguration of switch unit 15 (as shown in FIG. 13) to switch the transmission onto the protection path.

If the failure affects only the transmission from node 20c to node 20f (along the external ring 2), a similar sequence of operations is performed. In this case, however, node 20f detects the failure. Under a scenario in which both the transmission directions are affected by the failure, the first node as between nodes 20c and 20f that detects the absence of signals or of a signal quality degradation sends the other node the failure message (preferably along both the external ring 2 and the internal ring 3 by using the protection wavelengths $\lambda_{x,p}$ and $\lambda_{y,p}$). This first node subsequently operates a reconfiguration of its switch unit 15. The other node is alerted to the presence of a failure in the considered link by detecting the failure itself or by receiving the failure message from the first node (and only from one direction, in the preferred case of the bidirectional message transmission). In response, this other node sends a failure message back to the first node and operates to initiate a reconfiguration of its switch unit 15.

After the reconfiguration time, the signals that are transmitted between nodes 20c and 20f are carried on the respective protection path. Nodes 20d and 20e, which, in the example of FIG. 2, are the termination nodes of another working link in the same logical ring, are informed of the changed condition by checking the status of the channel that is carried by the protection wavelengths (i.e., by reading the failure message); consequently, these nodes 20d and 20e inhibit their protection mechanism.

When the failure is repaired, the normal condition is restored on each affected logical ring by resetting the switching layouts at the terminating nodes of the failed working links so as to re-route such links onto their original working path. On the logical ring, all the link terminating nodes that are not previously affected by the failure are informed of the release of the shared protection capacity by checking the status of the channel carried by the protection wavelengths (which are now unused). As a consequence, the protection mechanism of these link terminating nodes are no longer inhibited.

Figure 10:
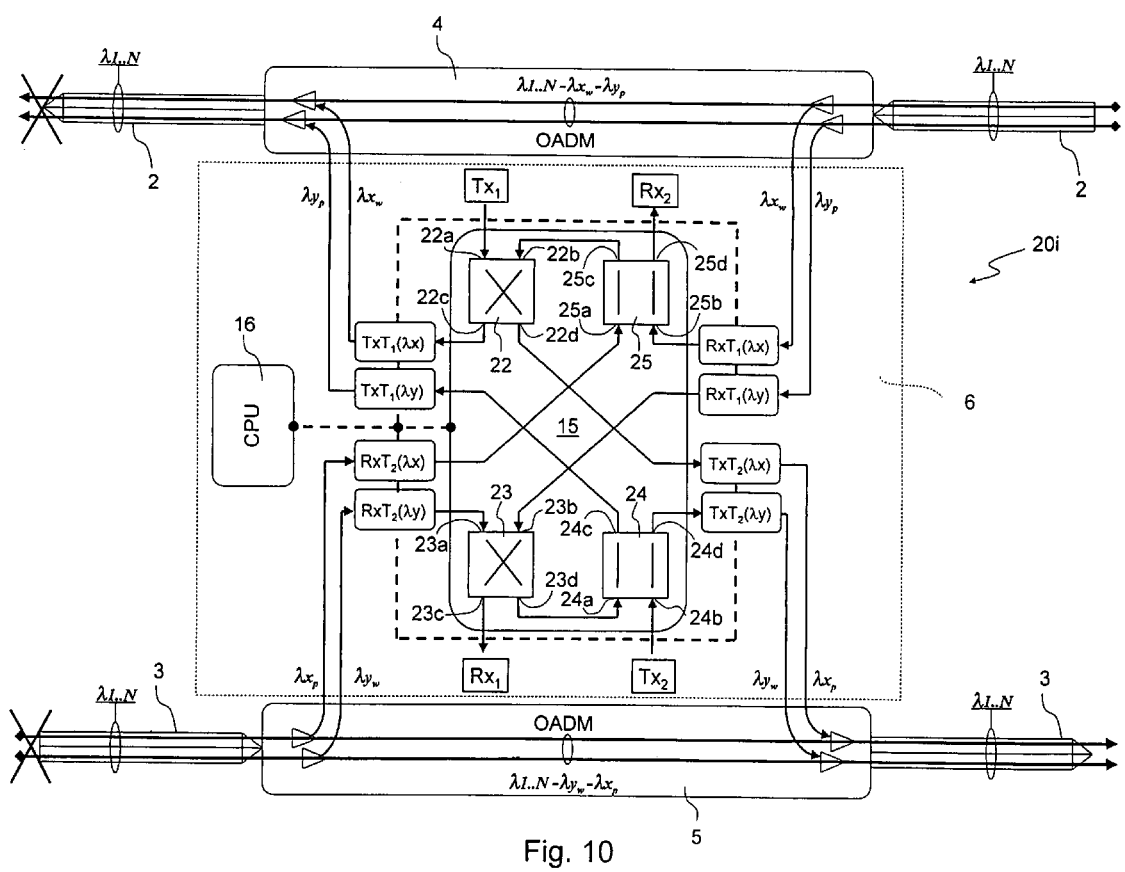
FIG. 10 is a diagram of the reconfiguration of the node of FIG. 3 when a failure occurs on the left-hand side of the node.

FIG. 10 shows the situation in which a failure occurs on a working link, which is defined by node 20i (together with a further node not shown); that is, a failure on the left-hand side of node 20i. Node 20i is informed of the failure condition by detecting, at the receiving transponder $RxT_2$ ($\lambda_y$), the absence of signals, or a signal quality degradation (like a BER over a predetermined threshold), or by receiving a failure message (as previously described). CPU 16 consequently generates an appropriate failure message to be sent to the other terminating node of the working link, preferably along both the external ring 2 and the internal ring 3. CPU 16 preferably sends this failure message to the transmitting transponder $TxT_1(\lambda_y)$ for transmission at the protection wavelength $\lambda_{y,p}$ and to the transmitting transponder $TxT_2(\lambda_x)$ for transmission at the protection wavelengths $\lambda_{x,p}$. CPU 16 subsequently initiates reconfiguration of switch unit 15, reconfiguring switches 22 and 23 from the bypass status to the switched status in order to avoid the failed working path by re-routing the transmission onto the protection path.

Figure 11:
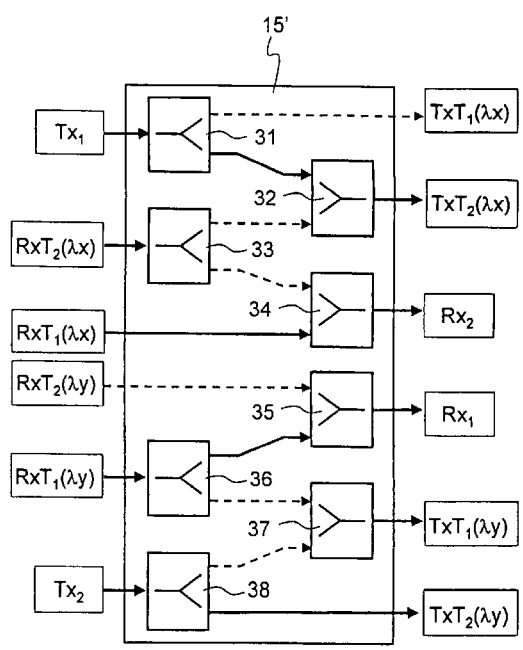
FIG. 11 is a diagram of the reconfiguration of the switching unit of FIG. 4 when a failure occurs on the left-hand side of the node.
Figure 12:
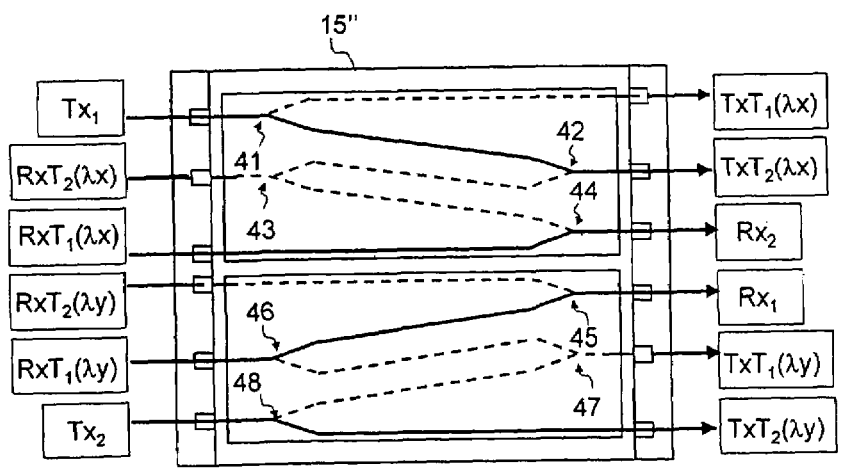
FIG. 12 is a diagram of the reconfiguration of the switching unit of FIG. 5 when a failure occurs on the left-hand side of the node.

In the new node configuration, the transmitter $Tx_1$ is connected to the transmitting transponder $TxT_2(\lambda_x)$, and the corresponding signals are then sent on the internal ring 3 in the clockwise direction. The receiver $Rx_1$ is connected to the receiving transponder $RxT_1(\lambda_y)$. The signals are then received from the external ring 2 in counter-clockwise direction. If the affected node includes a switch unit 15' (1×2 and 2×1 switches) or a switch unit 15" (integrated optics) in place of switch unit 15 (2×2 switches), the reconfigured status of the corresponding switch unit is as shown in FIG. 11 and in FIG. 12, respectively.

The node at the other end of the affected link performs the same operations, after receiving a failure message from the other node, or after detecting the absence of signals or a signal quality degradation at the receiving transponder $RxT_1$ ($\lambda_x$). The working link between the two nodes is consequently re-routed to the protection path associated with the working link. Both the reconfigured nodes also update the signalling information (generated by the respective CPUs and added to the transmitted signals in the respective transmitting transponders TxTs) that is carried by the protection wavelengths $\lambda_{x,p}$, $\lambda_{y,p}$ in order to inform all the other nodes on the same logical ring that the shared resource is at present used by the two affected nodes. Upon repairing the failure, both the nodes of the affected link can be restored to the normal operative condition of FIG. 3, thus releasing the shared protection resource.

In the case in which the nodes have more than one receiving/transmitting module 6, the described protection mechanism operates independently for each module 6.

Figure 14:
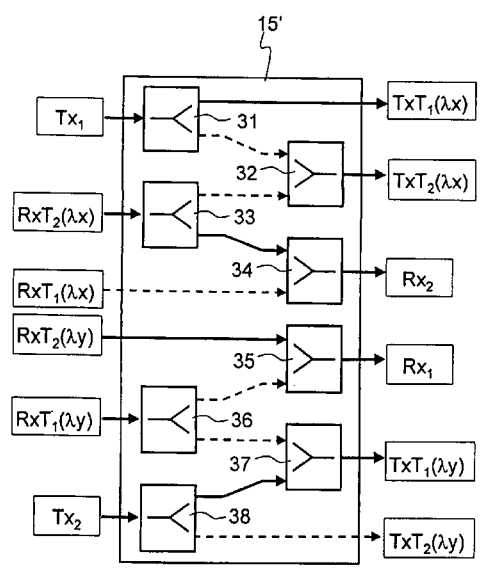
FIG. 14 is a diagram of the reconfiguration of the switching unit of FIG. 4 when a failure occurs on the right-hand side of the node.
Figure 15:
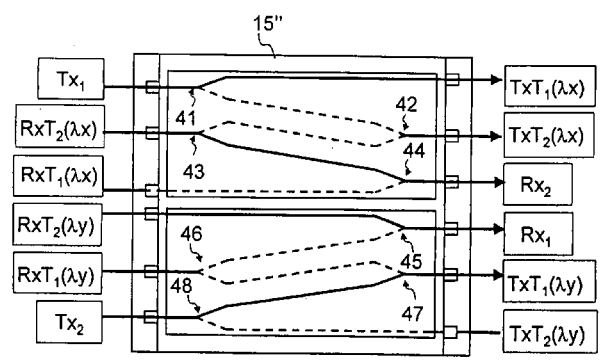
FIG. 15 is a diagram of the reconfiguration of the switching unit of FIG. 5 when a failure occurs on the right-hand side of the node.

FIGS. 13–15 show the situation in which a failure occurs on the right-hand side of the node 20i. The reconfiguration process is similar to that of the left-hand side failure, and thus, is not further described.

It is intended that, without depart from the scope of the present invention, the architecture of the nodes may be arranged so that, in the absence of failures, protection wavelengths $\lambda_{x,p}$ on the internal ring 3 and $\lambda_{y,p}$ on the external ring 2 may be used to transport low-priority traffic in the same direction as the other wavelengths on 5 the same ring.

What is claimed is:

1. An autoprotected optical communication system, comprising:
    a first optical carrier configured to transport optical signals in a first direction;
    a second optical carrier configured to transport optical signals in a second direction that is opposite to the first direction; and
    a plurality of nodes connected along the first optical carrier and the second optical carrier to form bidirectional links, the plurality of nodes communicating in pairs, one of the pairs defining a working link associated with a portion of the first optical carrier and a portion of the second optical carrier and being configured to exchange optical signals using a first wavelength on the first optical carrier and a second wavelength that is different from the first wavelength on the second optical carrier during a normal condition, the one pair of nodes being configured to exchange optical signals using the first wavelength on the second optical carrier and the second wavelength on the first optical carrier during a failure condition, wherein a response to the failure condition is executed on a channel level, and wherein each of the plurality of nodes includes a plurality of transmitting and receiving transponders, and wherein the plurality of transmitting transponders includes a first transmitting transponder optically coupled to the first optical carrier and configured to modulate a signal at the first wavelength, a second transmitting transponder optically coupled to the first optical carrier and configured to modulate a signal at a second wavelength, and a third transmitting transponder optically coupled to a second optical carrier and configured to modulate a signal at the first wavelength, the plurality of receiving transponders including a first receiving transponder optically coupled to the second optical carrier and configured to demodulate a signal having the first wavelength, a second receiving transponder optically coupled to the second optical carrier and configured to demodulate a signal having the second wavelength, a third receiving transponder optically coupled to the first optical carrier and configured to demodulate a signal having the second wavelength, and wherein, under the normal condition, optical switches in an optical switch unit are configured to optically connect an optical transmitter to the first transmitting transponder, to optically connect the first receiving transponder to the third transmitting transponder, to optically connect the second receiving transponder to an optical receiver, and to optically connect the third receiving transponder to the second transmitting transponder.

2. The system of claim 1, wherein each of the plurality of nodes selectively uses a predetermined subset of wavelengths within a set of transmission wavelengths, each of the plurality of nodes comprising:
    a plurality of optical add/drop multiplexers serially connected to the first optical carrier and the second optical carrier, respectively, each of the optical add/drop multiplexers configured to selectively perform at least one of adding the subset of wavelengths to the first optical carrier and to the second optical carrier, dropping the subset of wavelengths from the first optical carrier and the second optical carrier, and bypassing remaining wavelengths of the set of transmission wavelengths.

3. The system of claim 1, wherein each of the plurality of nodes comprises:
    an optical transmitter;
    an optical receiver; and
    a reconfigurable optical switch unit selectively coupling the optical transmitter and the receiver to the first optical carrier and the second optical carrier.

4. The system of claim 1, further comprising:
    another optical transmitter configured to generate an optical signal that includes information to be transmitted in the network; and
    another optical receiver configured to receive an optical signal that includes information that has been transmitted in the network, wherein the plurality of transmitting transponders includes a fourth transmitting transponder optically coupled to the second optical carrier and configured to modulate a signal at the second wavelength, the plurality of receiving transponders including a fourth receiving transponder optically coupled to the first optical carrier and configured to demodulate a signal having the first wavelength, during normal condition, the optical switches being configured to connect the first receiving transponder to the third transmitting transponder, to connect the fourth receiving transponder to the other receiver, and to connect the other optical transmitter to the second fourth transmitting transponder.

5. A method of providing autoprotection in an optical ring network that includes a first optical carrier, and a second optical carrier, and a plurality of nodes connected along the first optical carrier and the second optical carrier and configured to communicate in pairs to define bidirectional links, the method comprising:
    exchanging optical signals between one of the pairs of nodes over one of the bidirectional links by using a first wavelength on the first optical carrier and a second wavelength on the second optical carrier during normal operation;
    detecting a failed link among the bidirectional links;
    reconfiguring the nodes in the one pair to invoke a protection scheme that uses the first wavelength on the second optical carrier and the second wavelength on the first optical carrier to avoid the failed link, wherein the step of reconfiguring comprises switching optical connections which selectively couple an optical transmitter and an optical receiver to the first optical carrier and the second optical carrier; and
    transmitting a failure message between the nodes in the one pair based upon at least one of non-receipt of the optical signals and receipt of the optical signals that are degraded, wherein a response to a failure condition is executed on a channel level, and wherein each of the nodes includes a plurality of transmitting and receiving transponders, and wherein the plurality of transmitting transponders includes a first transmitting transponder optically coupled to the first optical carrier and configured to modulate a signal at the first wavelength, a second transmitting transponder optically coupled to the first optical carrier and configured to modulate a signal at a second wavelength, and a third transmitting transponder optically coupled to a second optical carrier and configured to modulate a signal at the first wavelength, the plurality of receiving transponders including a first receiving transponder optically coupled to the second optical carrier and configured to demodulate a signal having the first wavelength, a second receiving transponder optically coupled to the second optical carrier and configured to demodulate a signal having the second wavelength, a third receiving transponder optically coupled to the first optical carrier and configured to demodulate a signal having the second wavelength, and wherein, under the normal condition, optical switches in an optical switch unit are configured to optically connect an optical transmitter to the first transmitting transponder, to optically connect the first receiving transponder to the third transmitting transponder, to optically connect the second receiving transponder to an optical receiver, and to optically connect the third receiving transponder to the second transmitting transponder.

6. The method of claim 5, further comprising:
using a predetermined subset of wavelengths within a set of transmission wavelengths carried by the first optical carrier and the second optical carrier, wherein the step of exchanging includes optically separating, at each node of the plurality of nodes, each wavelength of the subset of wavelengths from the set of transmission wavelengths.

7. The method according to claim 5, wherein the step of detecting comprises:
verifying, in each of the plurality of nodes and for each wavelength in the set of wavelengths, whether the optical signals are received.

8. The method according to claim 5, wherein the step of detecting comprises:
verifying, in each of the plurality of nodes and for each wavelength in the set of wavelengths, whether the optical signals are degraded.

9. The method according to claim 5, wherein the step of detecting comprises:
verifying, in each of the plurality of nodes and for each wavelength in the set of wavelengths, whether the optical signals include a failure message.

10. The method of claim 5, further comprising:
providing another optical transmitter configured to generate an optical signal that includes information to be transmitted in the network; and
providing another optical receiver configured to receive an optical signal that includes information that has been transmitted in the network, % wherein the plurality of transmitting transponders includes a fourth transmitting transponder optically coupled to the second optical carrier and configured to modulate a signal at the second wavelength, the plurality of receiving transponders including a fourth receiving transponder optically coupled to the first optical carrier and configured to demodulate a signal having the first wavelength, during normal condition, the optical switches being configured to connect the first receiving transponder to the third transmitting transponder, to connect the fourth receiving transponder to the other receiver, and to connect the other optical transmitter to the fourth transmitting transponder.

11. A reconfigurable node of an autoprotected optical communication ring network having a first optical carrier and a second optical carrier, comprising:
an optical transmitter configured to generate optical signals;
an optical receiver configured to receive optical signals; and a plurality of transmitting transponders optically coupled to the first optical carrier and the second optical carrier;
a plurality of receiving transponders optically coupled to the first optical carrier and the second optical carrier; and
an optical switch unit that includes a plurality of optical switches coupled to the transmitting transponders and the receiving transponders, one of the optical switches being coupled to the optical transmitter, another one of the optical switches being coupled to the optical receiver, wherein the optical switches are configured to operate selectively under a normal operating condition and under a failure condition, the transponders using a first wavelength on the first optical carrier and a second wavelength that is different from the first wavelength on the second optical carrier during the normal condition, the transponders using the first wavelength on the second optical carrier and the second wavelength on the first optical carrier during the failure condition, a response to a failure condition being executed on a channel level, the optical switch unit including a number of switching blocks that is twice a number of protected channels, and wherein the plurality of transmitting transponders includes a first transmitting transponder optically coupled to the first optical carrier and configured to modulate a signal at the first wavelength, a second transmitting transponder optically coupled to the first optical carrier and configured to modulate a signal at a second wavelength, and a third transmitting transponder optically coupled to a second optical carrier and configured to modulate a signal at the first wavelength, the plurality of receiving transponders including a first receiving transponder optically coupled to the second optical carrier and configured to demodulate a signal having the first wavelength, a second receiving transponder optically coupled to the second optical carrier and configured to demodulate a signal having the second wavelength, a third receiving transponder optically coupled to the first optical carrier and configured to demodulate a signal having the second wavelength, and wherein, under the normal condition, the optical switches are configured to optically connect the optical transmitter to the first transmitting transponder, to optically connect the first receiving transponder to the third transmitting transponder, to optically connect the second receiving transponder to the optical receiver, and to optically connect the third receiving transponder to the second transmitting transponder.

12. The node according to claim 11, wherein the first wavelength and the second wavelength are selected from a set of transmission wavelengths, the node further comprising:
a plurality of optical add/drop multiplexers configured to optically couple the transmitting transponders and the receiving transponders to the first optical carrier and the second optical carrier to feed and extract a subset of wavelengths from the optical carriers, and to bypass remaining wavelengths of the set of transmission wavelengths.

13. The node according to claim 11, wherein the optical switches include 2×2 switches.

14. The node according to claim 11, wherein the optical switches include 1×2 and 2×1 switches.

15. The node according to claim 13, wherein the optical switches include discrete switching components.

16. The node according to claim 13, wherein the optical switches include an integrated switching matrix.

17. The node according to claim 15, wherein the optical switches include at least one of opto-mechanical switches, thermo-optical switches, magneto-optical switches, liquid crystal switches, semiconductor switches, electro-optical switches, micro-mechanical switches, and lithium niobate integrated circuit switches.

18. The node according to claim 11, further comprising:
another optical transmitter configured to generate an optical signal that includes information to be transmitted in the network; and
another optical receiver configured to receive an optical signal that includes information that has been transmitted in the network, wherein the plurality of transmitting transponders includes a fourth transmitting transponder optically coupled to the second optical carrier and configured to modulate a signal at the second wavelength, the plurality of receiving transponders including a fourth receiving transponder optically coupled to the first optical carrier and configured to demodulate a signal having the first wavelength, during normal condition, the optical switches being configured to connect the first receiving transponder to the third transmitting transponder, to connect the fourth receiving transponder to the other receiver, and to connect the other optical transmitter to the fourth transmitting transponder.

* * * * *

UNITED STATES PATENT AND TRADEMARK OFFICE
CERTIFICATE OF CORRECTION

| | |
|---|---|
| PATENT NO. | : 6,973,267 B1 |
| APPLICATION NO. | : 09/608657 |
| DATED | : December 6, 2005 |
| INVENTOR(S) | : Arecco et al. |

It is certified that error appears in the above-identified patent and that said Letters Patent is hereby corrected as shown below:

Column 22, Line 29, after "to the", delete "second".
Column 23, Line 47, after "network", delete "%".

Signed and Sealed this

Sixteenth Day of January, 2007

JON W. DUDAS
*Director of the United States Patent and Trademark Office*